United States Patent

Nagate et al.

[11] Patent Number: 5,864,192
[45] Date of Patent: Jan. 26, 1999

[54] BRUSHLESS MOTOR WITH MAGNETIC SENSOR TO DETECT LEAKED MAGNETIC FLUX

[75] Inventors: Takashi Nagate; Akiyoshi Ishiguro, both of Suwa, Japan

[73] Assignee: Seiko Epson Corporation, Tokyo, Japan

[21] Appl. No.: 951,507

[22] PCT Filed: Jul. 7, 1993

[86] PCT No.: PCT/JP93/00934

§ 371 Date: Mar. 20, 1995

§ 102(e) Date: Mar. 20, 1995

[87] PCT Pub. No.: WO94/01920

PCT Pub. Date: Jan. 20, 1994

Related U.S. Application Data

[63] Continuation of Ser. No. 757,339, Nov. 27, 1996, abandoned, and Ser. No. 362,518, Mar. 20, 1995, abandoned.

[30] Foreign Application Priority Data

Jul. 9, 1992 [JP] Japan .................................. 4-182552
Aug. 11, 1992 [JP] Japan .................................. 4-214342

[51] Int. Cl.⁶ .................................................. H02K 21/12
[52] U.S. Cl. .......................... 310/156; 310/68 B; 310/261
[58] Field of Search ..................... 310/156, 261, 310/68 B

[56] References Cited

U.S. PATENT DOCUMENTS

| | | | |
|---|---|---|---|
| Re. 31,278 | 6/1983 | Schmider | 310/268 |
| 3,728,565 | 4/1973 | O'Callaghan | 318/618 |
| 4,011,476 | 3/1977 | Beard | 310/70 R |
| 4,166,977 | 9/1979 | Glauert et al. | 324/173 |
| 4,359,685 | 11/1982 | Eguchi et al. | 324/208 |
| 4,370,614 | 1/1983 | Kawada et al. | 324/173 |
| 4,394,594 | 7/1983 | Schmider et al. | 310/68 R |
| 4,481,469 | 11/1984 | Hauler et al. | 324/174 |
| 4,490,764 | 12/1984 | Butz | 360/133 |
| 4,506,217 | 3/1985 | Rothley et al. | 324/208 |
| 4,506,338 | 3/1985 | Danno et al. | 364/551 |
| 4,658,162 | 4/1987 | Koyama et al. | 310/68 R |
| 5,148,070 | 9/1992 | Frye et al. | 310/168 |
| 5,148,104 | 9/1992 | Ishikawa et al. | 324/173 |
| 5,161,361 | 11/1992 | Talley et al. | 57/264 |
| 5,194,771 | 3/1993 | Otsuki et al. | 310/68 B |
| 5,410,201 | 4/1995 | Tanaka et al. | 310/68 B |

Primary Examiner—Nestor Ramirez
Assistant Examiner—Elvin G. Enad
Attorney, Agent, or Firm—Kanesaka & Takeuchi

[57] ABSTRACT

A brushless motor includes a stator and a rotor rotatably supported inside the stator. The rotor has a rotor yoke formed by laminating a large number of steel plates, the rotor yoke has an even number of magnetic pole portions protruding outward, and a field magnet is fitted to each of the magnetic pole portions or every other magnetic pole portions. A magnetic sensor is disposed within the range in which the sensor can directly detect a magnetic flux leaking outside from an end face of the rotor and is less affected by irregular fluxes near the rotor end face, so that this sensor can detect a peak point of a flux density around the rotor. A magnetic sensor is disposed within the range where the influences of the irregular fluxes are small. A magnet to be detected is fitted to the rotor end face, and a magnetic sensor for one direction and a magnetic sensor for the other direction are disposed near the trajectory of rotation of the detected magnet.

16 Claims, 36 Drawing Sheets

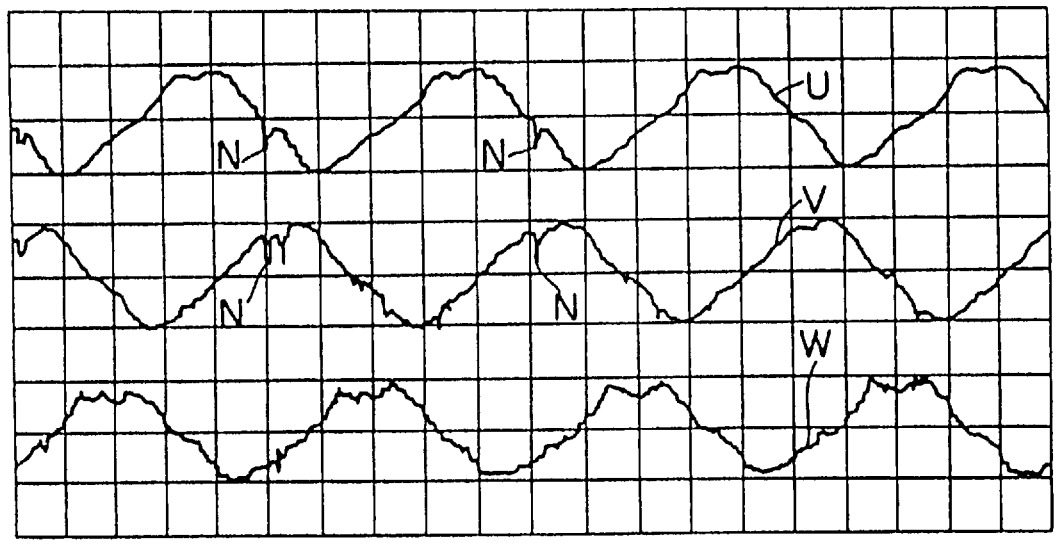
FIG.6(a)      5ms/DIV
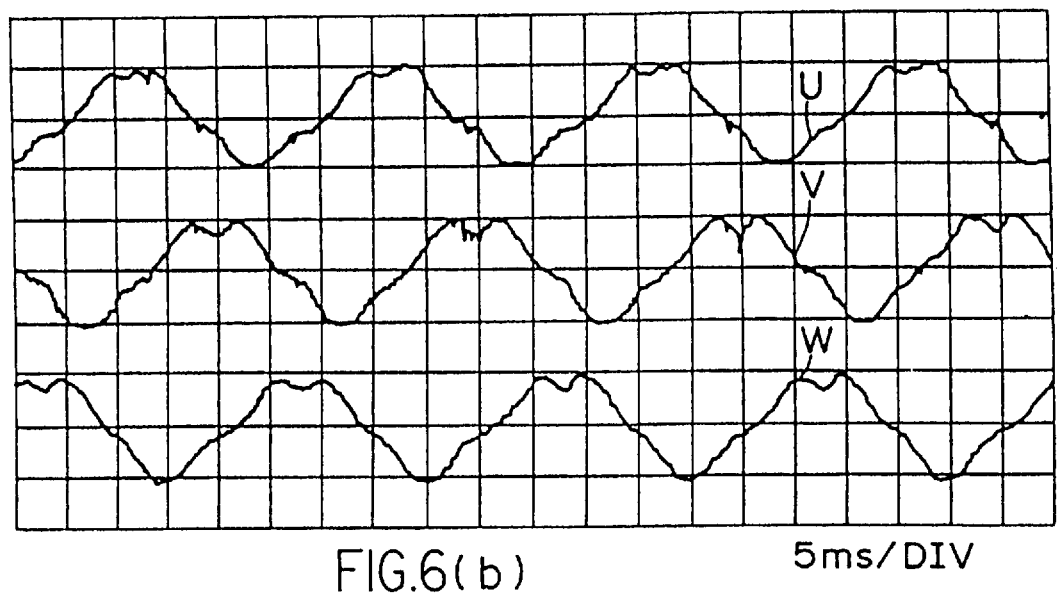
FIG.6(b)      5ms/DIV

| HALL IC POSITION (mm) | ROTATING DIRECTION | RATED EFFICIENCY % (rpm-kgf·m) | | | | MAXIMUM LOAD TORQUE * (kgf·m) | MAXIMUM ROTATING SPEED (rpm-kgf·m) |
|---|---|---|---|---|---|---|---|
| | | 1000-0.1 | 1200-0.24 | 2000-0.10 | | | |
| R=21 | CCW | 80.1 | 78.0 | 84.9 | | 0.151 | 2849-0.020 |
| | CW | 85.0 | 77.2 | 88.9 | | 0.153 | 2706-0.018 |
| R=23 | CCW | 86.2 | 78.0 | 88.9 | | 0.163 | 2925-0.019 |
| | CW | 86.8 | 77.2 | 90.5 | | 0.140 | 2918-0.019 |
| R=24.5 | CCW | — | 75.1 | 82.8 | | 0.150 | 2868-0.018 |
| | CW | — | 74.5 | — | | — | — |
| R=28 | CCW | — | 73.0 | 88.5 | | 0.155 | 2899-0.018 |
| | CW | — | — | — | | — | — |

* at 2000rpm

FIG.16

BRUSHLESS MOTOR WITH MAGNETIC SENSOR TO DETECT LEAKED MAGNETIC FLUX

CROSS-REFERENCE TO THE RELATED APPLICATIONS

This is a continuing application of Ser. No. 08/757,339 filed Nov. 27, 1996, now abandoned, and Ser. No. 08/362,518 filed Mar. 20, 1995, now abandoned.

TECHNICAL FIELD

This invention relates to a brushless motor which has a rotor having field permanent magnets inserted into a rotor yoke made of laminated steel plates and a magnetic sensor disposed to oppose to the end face of the rotor.

BACKGROUND ART

Generally known conventional brushless motors consist of a rotor which has a plurality of field permanent magnets inserted into a rotor yoke made of laminated steel plates, and a stator which has a magnetic pole portion opposed to the outer peripheral face of the magnet portion of the rotor with a small gap therebetween.

This type of brushless motor is proposed, to detect a rotational position of the rotor, to adhere to an end face of the rotor a magnet piece to be detected for specifying a rotational position of the rotor, to dispose a magnetic sensor near the trajectory of rotation of the magnet piece to be detected, and to use the magnetic sensor to detect magnetism of the magnet piece to be detected, thereby detecting the rotational position of the rotor.

FIG. 37 shows a vertical sectional view of the above brushless motor having the magnet pieces. A brushless motor 51 has a pair of housing members 53, 54 fastened with bolts 52, and these housing members 53, 54 rotatably support a rotatable shaft 57 with ball bearings 55, 56. To the rotatable shaft 57, a rotor 58 is fixed, and one end of the rotatable shaft 57 is structured to protrude from the end face of the housing member 53 to externally transmit a rotary force of the rotor 58. A stator 59 is disposed around the rotor 58 and held between the housing members 53, 54.

The rotor 58 consists of a rotor yoke 50 which has many steel plates laminated, and a plurality of field permanent magnets 61 which are inserted into the rotor yoke 50. The stator 59 consists of a stator yoke 62 made of laminated steel plates, and stator coils 63 wound on the stator yoke 62. A part of the inner peripheral face of the stator yoke 62 forms a magnetic pole portion 59a of the stator, and the stator magnetic pole portion 59a is opposed to the outer peripheral face of a magnetic pole portion 58a of the rotor 58 with a small distance therebetween.

A magnet piece 64 to be detected is adhered to an end face 58b of the rotor 58. A magnetic sensor board 66 having a plurality of magnetic sensors 65 disposed is fixed to the housing member 53 near the trajectory of rotation of the magnet piece 64 to be detected.

In the above structure, when the rotor 58 of the brushless motor 51 rotates, the magnet piece 64 to be detected is also rotated and approached to the magnetic sensors 65 when it is rotated 360 degrees. The magnetic sensors 65 detect magnetism of the magnet piece 64 to be detected to detect the rotational position of the rotor 58. But, it is known that since this brushless motor 51 has a large distance between the field permanent magnets 61 and the stator magnet pole portion 59a, a magnetic flux is attracted in the rotating direction by an interaction with the stator magnetic pole portion 59a when rotating, and the position of a magnetic flux density peak point in an outside space of the rotor 58 does not agree with the actual rotational position of the rotor 58.

FIG. 38 shows a difference between a change of the magnetic flux density in the outside space of the rotor end face 58b of the brushless motor 51 and the rotational position of the rotor 58 detected by the magnet piece 64 to be detected. In FIG. 38, the horizontal axis shows a lapse of time, and the vertical axis shows the magnitude of an electric signal. Curve L1 shows a change of the magnetic flux density in the outside space of the rotor end face 58b, and kinked line L2 shows the rotational position of the rotor 58 detected by the magnet piece 64 to be detected. It is seen from the drawing that in a brushless motor having field permanent magnets in a rotor yoke and a relatively large distance between the field permanent magnets and a stator magnetic pole portion, a magnetic flux during rotation is attracted in the rotating direction by the stator magnetic pole portion, and the magnetic flux density (curve L1) forms a waveform advanced than the actual rotational position (kinked line L2) of the rotor. Specifically, the alternate long and short dash line indicates a state that the magnetic flux density (curve L1) is not advanced than the actual rotational position (kinked line L2) of the rotor, but the magnetic flux density (curve L1) indicated by the solid line is advanced by a time difference T at the position of point 0 of the electric signal than the magnetic flux density (curve L1) indicated by the alternate long and short dash line. This time difference T can be converted into a rotational angle of the rotor, and this rotational angle is equal to the displacement of the magnetic flux. And it is known that this displacement of the magnetic flux (hereinafter referred to as an angle of lead) increases substantially in proportion to the magnitude of a current applied to the motor.

Regarding the deviation of the position of the magnetic flux density peak point in the outside space of the rotor 58 from the actual rotational position of the rotor 58, when a Hall IC is used, a rotating speed is fixed at 1200 rpm, and torque is varied, the deviation of the peaks of the magnetic flux density outside of the rotor and the signal of the Hall IC obtained from the magnet to be detected at the maximum efficiency with respective torque is as follows.

| Torque (Kgm) | Deviation of Hall IC and peaks of magnetic flux density (electrical angle) | Maximum efficiency (%) |
| --- | --- | --- |
| 0.05 | 20° ± 10° | 90 |
| 0.10 | 22.5° ± 10° | 87 |
| 0.15 | 25° ± 10° | 85 |
| 0.20 | 28.5° ± 9° | 82 |
| 0.25 | 30° ± 9° | 79 |

As obvious from the above table, the peak point of the magnetic flux density in the space around the rotor 58 is advanced than the actual rotational position of the rotor 58. Further, this angle of lead is almost proportional to the motor torque, and an attaching error of the Hall IC to obtain the maximum efficiency is in a range of 20° (±10°), but a tolerance becomes small as the torque increases, making it difficult to attach.

FIG. 39 is a magnetic sensor board of a three-phase four-pole brushless motor. In this case, a Hall IC was used for the magnetic sensor. A Hall IC 65 is one IC combining a function of detecting the direction of a magnetic field using the Hall effect and the function of an amplifier. When N pole is approached to above the Hall IC, output is about 5 (V), and when S pole, output is 0 (V). Therefore, one cycle of an electrical angle becomes N (5V) and S (0V), but since one cycle of a mechanical angle becomes N, S, N and S, it is known that the electrical angle to the mechanical angle is 2 to 1. (The electrical angle will be hereinafter referred to as the "electrical angle", and the mechanical angle will not be indicated.)

Generally, the three-phase four-pole brushless motor needs three Hall ICs 65 at intervals of 60 degrees peripherally on a circle having the same diameter (a distance R from the center axis is 23 mm in this example, which will be simply referred to as "R23" hereinafter), and they are soldered at intervals of 60 degrees on the magnetic sensor board 66. Furthermore, mounting holes 67 are formed at two locations of the magnetic sensor board 66 to fix to the housing member, and a pattern 69 is not formed on a peripheral portions 68 around the mounting holes 67. Lands 70 are disposed as connections to drive the Hall ICs 65 or to externally output a signal, and a through hole 71 is formed at the center of each land 70. A lead 72 is inserted in the through hole 71 from the back of the magnetic sensor board 66 and soldered on the land 70. The magnetic sensor board 66 has an outer periphery 73 to locate inside the coil 63 and an inner periphery 74 to locate outside the outer periphery of the housing bearing. And, an angle in the rotating direction is in a shape that a size for the mounting holes 67 is added to an arranging angle of 120 degrees for the three Hall ICs, so that the pattern is closely formed although the magnetic sensor board has a large shape.

Since the above conventional brushless motor detects only the rotational position of the rotor using the magnet piece to be detected, it has disadvantages that an angle of lead of the magnetic flux which varies depending on the motor current or motor torque cannot be detected, and when the magnetic pole portion of the stator is excited based on the detected signal, the stator magnetic pole portion which generates a rotary force most cannot be excited, and the motor efficiency is lowered.

On the other hand, it is considered to dispose the magnet piece to be detected or the magnetic sensor previously displaced in one direction assuming the angle of lead a magnetic flux, but this method cannot be applied to a bidirectionally rotatable brushless motor which is required to rotate the rotor in both directions.

While the above method detects the rotational position of the rotor yoke by the above magnetic sensor, there is a known sensorless brushless motor which detects the rotational position of the rotor by utilizing a back electromotive force to be generated on the stator side by the rotation of the rotor.

This sensorless brushless motor can detect the highest position of the magnetic flux density around the rotor, but has a disadvantage that an electric circuit is complicated because the back electromotive force generated on the stator side is detected.

SUMMARY OF THE INVENTION

Accordingly, an object of this invention is to provide a brushless motor having a rotor which has a plurality of field permanent magnets inserted into a rotor yoke made of steel plates laminated in many numbers, which, in a simple structure, can detect the peak point of a magnetic flux density with respect to an angle of lead of the magnetic flux variable depending on the motor current, and has a high motor efficiency (brushless motor of a first group).

Another object of this invention is, in the above type of brushless motor, to provide in a simple structure a brushless motor which can detect the peak point of a magnetic flux density with respect to an angle of lead variable depending on the motor torque and has a high motor efficiency, and to provide a brushless motor whose cost is reduced by miniaturizing a magnetic sensor board and improving a fixing method (brushless motor of a second group).

Still another object of this invention is, in the above type of brushless motor, to provide in a simple structure a bidirectionally rotatable brushless motor which can detect the peak point of a magnetic flux density around the rotor when rotating in either direction, and has a high motor efficiency (brushless motor of a third group).

Other objects of this invention are to provide a small number of devices capable of improving the performance of the above brushless motors.

The brushless motor of the first group according to this invention, in a brushless motor comprising a stator and a rotor rotatably supported within the stator, the rotor having a rotor yoke which is formed by laminating many steel plates, the rotor yoke having an even number of magnetic pole portions protruded outward, and a field permanent magnet which is inserted in each magnetic pole portion or every other magnetic pole portions, is characterized by having a magnetic sensor for detecting a magnetic flux leaked outside from an end face of the rotor, the magnetic sensor being positioned at a prescribed distance from the end face of the rotor, the prescribed distance being in a range of a distance or less that the magnetic sensor can directly detect the magnetic flux leaked outside from the end face of the rotor and also a distance or more that a noise is generated in a detected signal due to irregular magnetic fluxes near the end face of the rotor.

Therefore, the brushless motor of this invention has the magnetic sensor disposed at the prescribed distance from the end face of the rotor to directly detect the magnetic flux leaked outside of the rotor end face through the rotor yoke, so that a position of the peak point of the magnetic flux density around the rotor can be detected even when the magnetic flux of the rotor is attracted toward the rotating direction by the interaction with the stator when rotating. Thus, an optimum magnetic pole portion of the stator can be excited according to the position of the peak point of the magnetic flux density around the rotor, and a brushless motor having a high motor efficiency regardless of the angle of lead of the magnetic flux can be obtained.

And, in the brushless motor of this invention, the magnetic sensor can directly detect the magnetic flux from the field permanent magnets of the rotor and is disposed at the distance so as not to be largely affected by irregular magnetic fluxes near the rotor end face, largely reducing noises in an electric signal showing the rotational position of the rotor. And, the magnet piece to be detected required in conventional brushless motors can be omitted to provide a brushless motor having a simple structure.

In this specification, the magnetic sensor is used in a sense including a coil. Therefore, the coil is included in a concept of the magnetic sensor not only in the invention of the first group but also through the following description.

The brushless motor of the second group according to this invention, in a brushless motor comprising a stator and a rotor rotatably supported within the stator, the rotor having a rotor yoke which is formed by laminating many steel plates, the rotor yoke having an even number of magnetic pole portions protruded outward, and a field permanent magnet which is inserted in each magnetic pole portion or every other magnetic pole portions, is characterized by having a magnetic sensor for detecting a magnetic flux leaked outside from an end face of the rotor, setting a radial distance of the magnetic sensor from the center of a rotatable shaft to scan a range outside of the field magnets and inside of the outer end of the rotor, disposing a plurality of magnetic sensors on circles having different diameters on a magnetic sensor board, and arranging a pitch interval of each magnetic sensor on the circle different from a pitch interval of a stator winding phase.

And, the brushless motor of the second group according to this invention, in a brushless motor comprising a stator and a rotor rotatably supported within the stator, the rotor having a rotor yoke which is formed by laminating many steel plates, the rotor yoke having an even number of magnetic pole portions protruded outward, a field permanent magnet which is inserted in each magnetic pole portion or every other magnetic pole portions, and a plurality of magnetic sensors to detect a magnetic flux leaked outside from an end face of the rotor, is characterized by a method for disposing the magnetic sensors that the plurality of magnetic sensors are disposed on circles having different diameters to advance a rotor detecting position, a rotational angle of the magnetic sensors is adjusted to delay the angle of lead, and a space between the magnetic sensors is narrowed.

Therefore, since the above brushless motor of this invention disposes the magnetic sensors at a prescribed distance from the end face of the rotor to directly detect the magnetic flux of the field permanent magnets leaked outside from the rotor end face by the magnetic sensors, when the magnetic flux of the rotor during rotating is attracted in the rotating direction by the interaction with the stator magnetic pole portion or the angle of lead is varied due to the motor current (motor torque), the position of the peak point of the magnetic flux density in the outside space of the rotor is always detected to excite an optimum magnetic pole portion of the stator, and the motor efficiency can be improved. Further, since a change in the maximum efficiency against a mounting error of the magnetic sensors in the rotating direction is less and the angle of lead is same regardless of the load, setting can be made under any load.

And, the method for disposing the magnetic sensors according to this invention can vary a distance of the magnetic sensors from the shaft to change the angle of lead and narrow the angle between the magnetic sensors. As a result, the size of the magnetic sensor board is reduced and its cost is lowered.

The brushless motor of the third group according to this invention, in a brushless motor comprising a stator and a rotor rotatably supported within the stator, the rotor having a rotor yoke which is formed by laminating many steel plates, the rotor yoke having an even number of magnetic pole portions protruded outward, and a field permanent magnet which is inserted in each magnetic pole portion or every other magnetic pole portions, is a bidirectionally rotatable brushless motor which is characterized by attaching a magnet piece to be detected to an end face of the rotor to specify a rotational position of the rotor, and disposing a one direction magnetic sensor for detecting a rotational position of the rotor rotating in one direction and an other direction magnetic sensor for detecting a rotational position of the rotor rotating in the other direction in the vicinity of the trajectory of rotation of the magnet piece to be detected, the one direction magnetic sensor and the other direction magnetic sensor being displaced respectively by a prescribed angle substantially equal to the angle of lead of a magnetic flux in opposite directions with respect to a rotating direction of the rotor to detect a desired position of the rotor.

Therefore, the bidirectionally rotatable brushless motor of this invention has a magnet piece to be detected for specifying a rotational position of the rotor, a magnetic sensor for detecting a rotational position of the rotor rotating in one direction and a magnetic sensor for detecting a rotational position of the rotor rotating in the other direction, and since these magnetic sensors are fixed as displaced by a prescribed angle almost equal to an angle of lead of a magnetic flux in opposite directions with respect to a rotating direction of the rotor, when the rotor is rotating, the magnetic sensors output the rotational position of the rotor advanced by the angle of lead of the magnetic flux than the actual rotational position of the rotor. This outputted rotational position of the rotor agrees with the peak point of a magnetic flux density in the outside space of the rotor, so that the rotor can be rotated most efficiently by exciting the magnetic pole portion of the stator based on the output.

BRIEF DESCRIPTION OF THE DRAWINGS

[FIG. 6] Graphs showing the compared analogue waveforms of magnetism of a brushless motor having a nonmagnetic plate and a brushless motor not having a nonmagnetic plate.

[FIG. 16] A table showing the results of measuring the relation between the radial position and the efficiency of the Hall IC.

BEST MODE FOR CARRYING OUT THE INVENTION

A first embodiment of the invention will be described with reference to the drawings.

Figure 1:
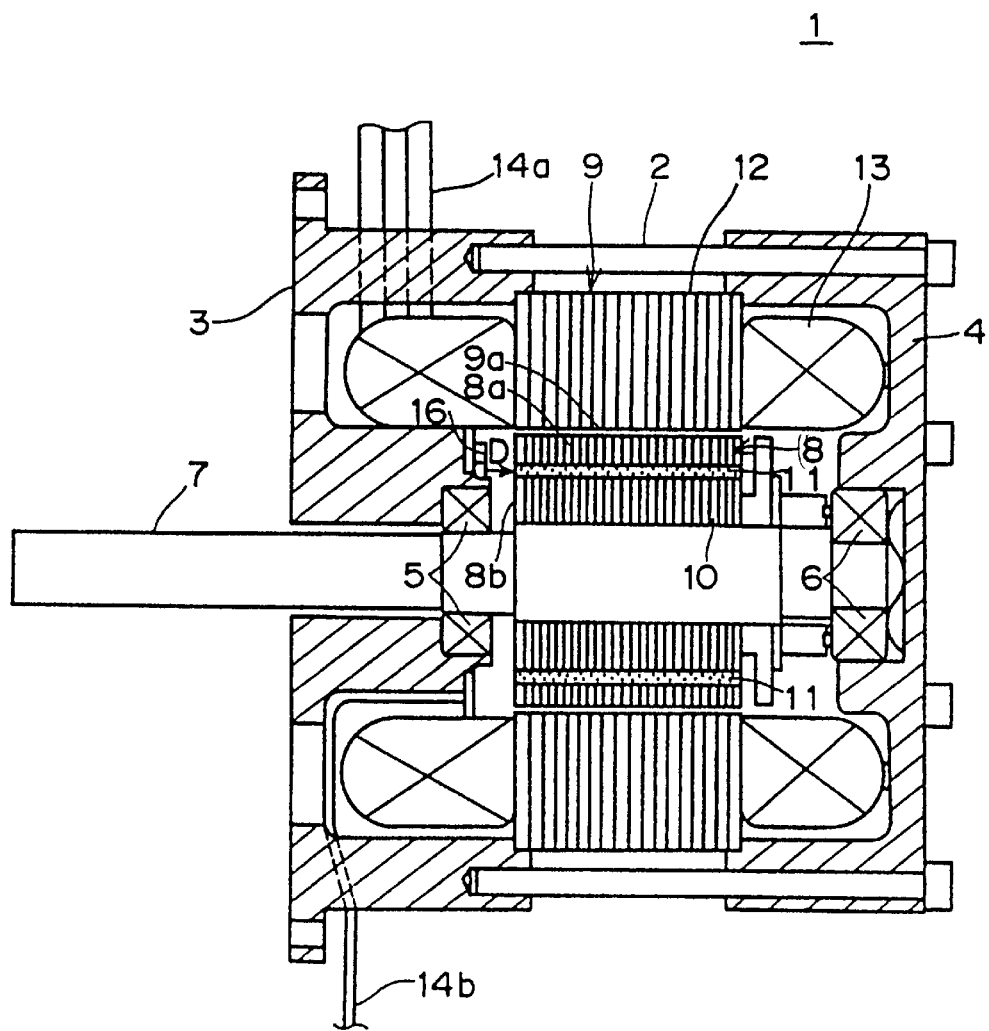
[FIG. 1] A vertical sectional view showing one embodiment of the brushless motor of this invention.

FIG. 1 shows a vertical sectional view of the brushless motor of this embodiment. A brushless motor 1 has a pair of housing members 3, 4 fastened with bolts 21 and these housing members 3, 4 rotatably support a rotatable shaft 7 with ball bearings 5, 6. To the rotatable shaft 7, a rotor 8 is fixed, and one end of the rotatable shaft 7 is structured to protrude from the end face of the housing member 3 to externally transmit a rotary force of the rotor 8. A stator 9 is disposed around the rotor 8 and held between the housing members 3, 4.

The rotor 8 consists of a rotor yoke 10 which has many steel plates laminated, and a plurality of field permanent magnets 11 which are inserted into the rotor yoke 10. The stator 9 consists of a stator yoke 12 made of laminated steel plates, and stator coil$13 wound on the stator yoke 12. A part of the inner face of the stator yoke 12 forms a magnetic pole portion 9a of the stator 9, and the magnetic pole portion 9a of the stator is opposed to the outer peripheral face of a magnetic pole portion 8a of the rotor 8 with a small distance therebetween. The stator coil 13 is connected to an external power supply through a lead 14a.

A magnetic sensor 16 such as a Hall element and a Hall IC is attached to a part of the housing member 3 opposing to the end face 8b of the rotor 8. The magnetic sensor 16 and the rotor end face 8b are opposed to each other with a prescribed distance D therebetween. Reference numeral 14b indicates an electric signal lead for externally sending an electric signal of magnetism detected by the magnetic sensor 16.

Figure 2:
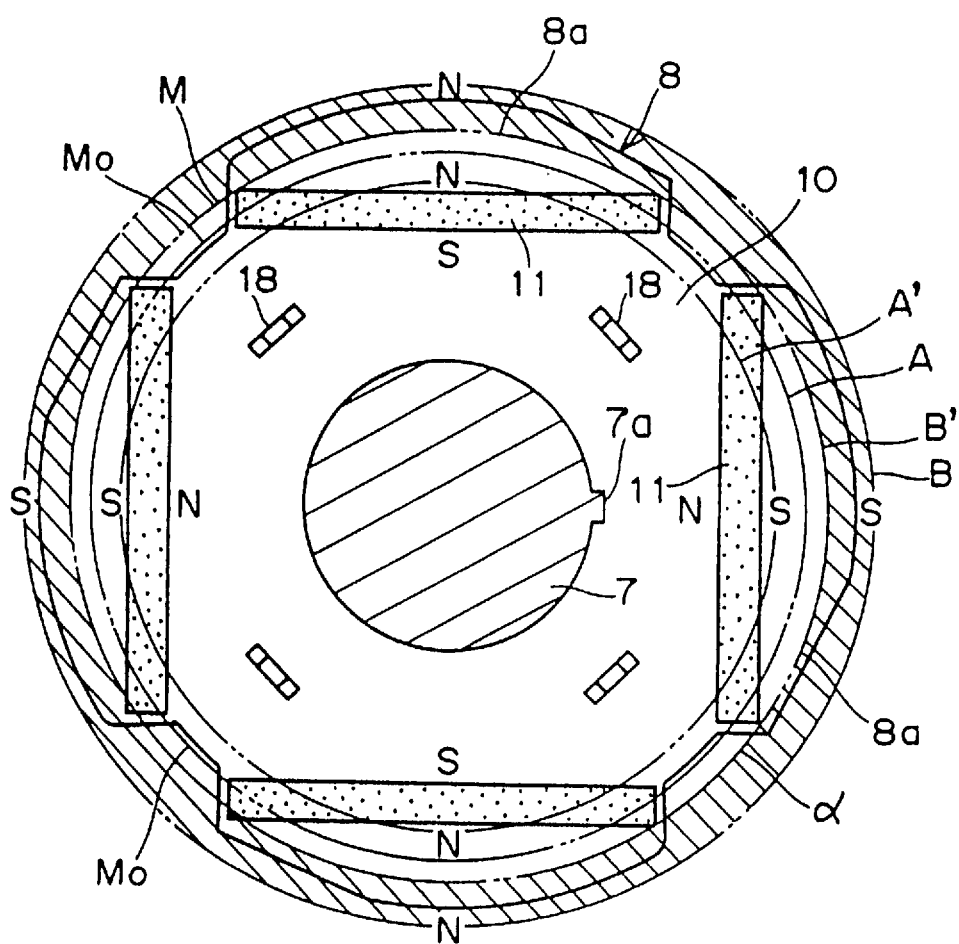
[FIG. 2] A view showing the front of the rotor of the brushless motor of this invention.

FIG. 2 shows an end face of the rotor 8. The rotor 8 consists of four rotor magnetic pole portions 8a protruded outward in the radial direction at an angle of 90 degrees, and the field permanent magnet 11 inserted into each rotor magnet pole portion 8a. At the center of the rotor 8, the rotatable shaft 7 is inserted, and the rotatable shaft 7 and the rotor 8 are configured to rotate integrally with a key 7a. Reference numeral 18 indicates caulking sections for integrally caulking the Δ steel plates which form the rotor yoke 10.

Each field permanent magnet 11 is inserted in the base of the rotor magnetic pole portion 8a so that N and S poles are alternately positioned outside. The magnetic flux of the field permanent magnets 11 is guided by the leading end of the rotor magnetic pole portion 8a, and gets in or out of the outer peripheral face of each rotor magnetic pole portion 8a. Thus, the field permanent magnets 11 of the rotor 8 are alternately magnetized in the N and S poles in the circumferential direction.

Imaginary lines A, A' in the drawing indicate the trajectories where the magnetic sensor 16 is relatively moved by the rotation of the rotor 8. On the other hand, imaginary lines B, B' and a hatched area α therebetween indicate an unstable area of the magnetic flux present on the outer periphery of the rotor 8. The magnetic flux in the unstable magnetic flux area α is always varied unstably by an effect of the rotating magnetic field generated by the stator 9. As shown in the drawing, the relative moving trajectories A, A' of the magnetic sensor 16 are positioned outside of the field permanent magnets 11 and inside of the unstable magnetic flux area α.

And, as shown in FIG. 2, the rotor 8 has a groove M between the rotor magnetic pole portions 8a, and the bottom M0 of the groove M is substantially aligned with the relative trajectories of rotation A, A' of the magnetic sensor 16. The trajectories A, A' where the magnetic sensor 16 moves pass near the intersection of the base ends of the rotor magnetic pole portions 8a, and irregular magnetic fluxes to be described afterward are present near the intersection of the base ends of the rotor magnetic pole portions 8a, tending to be a cause to generate a noise in the detected electric signal.

Figure 3:
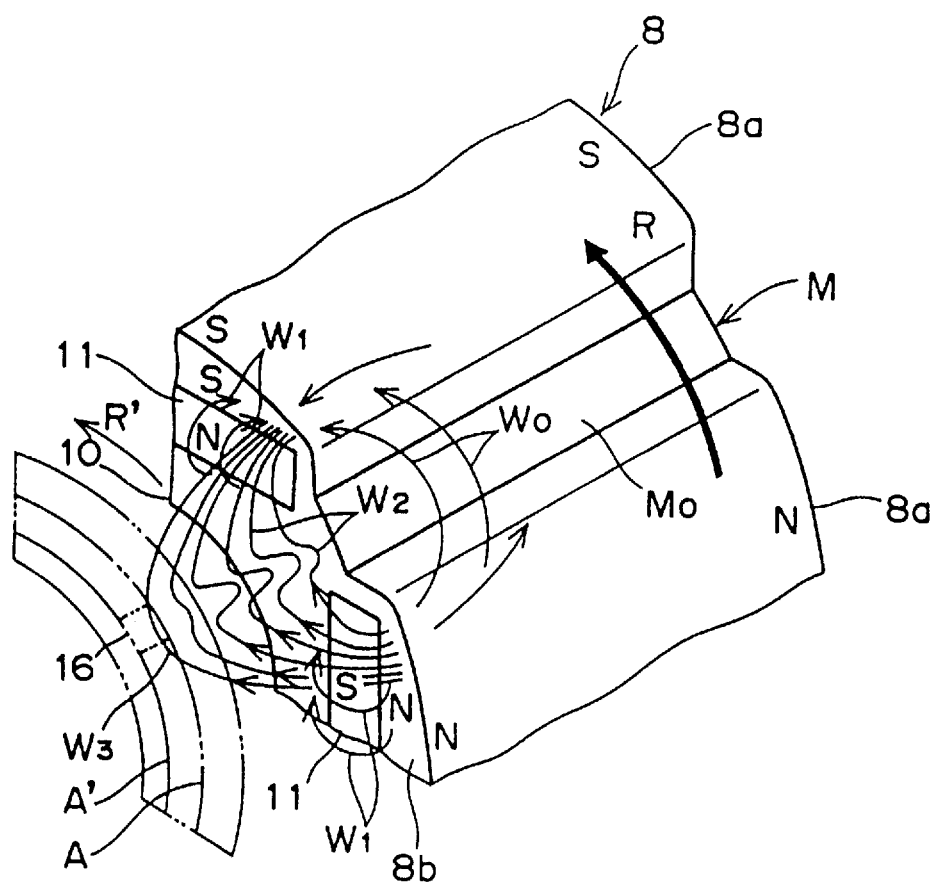
[FIG. 3] A perspective view showing a magnetic flux outside of the rotor end face of the brushless motor of this invention.
Figure 4A:
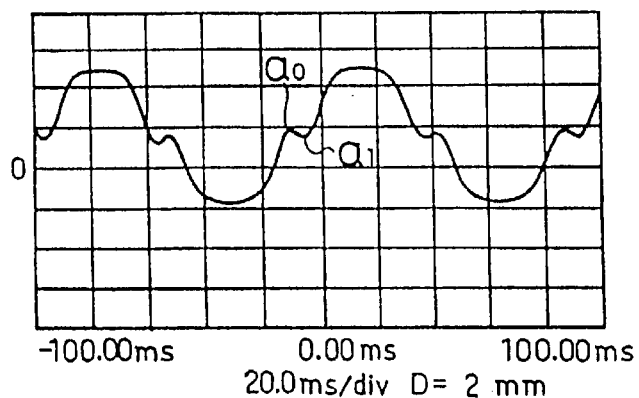
[FIG. 4] Graphs showing the compared analogue waveforms of magnetism with a distance D between the magnetic sensor and the rotor end face varied.
Figure 4B:
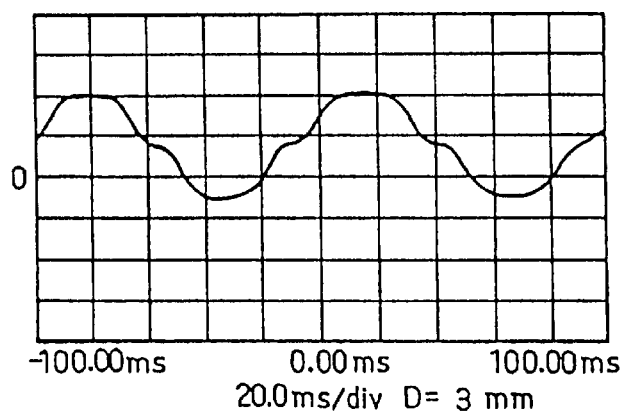
Figure 4C:
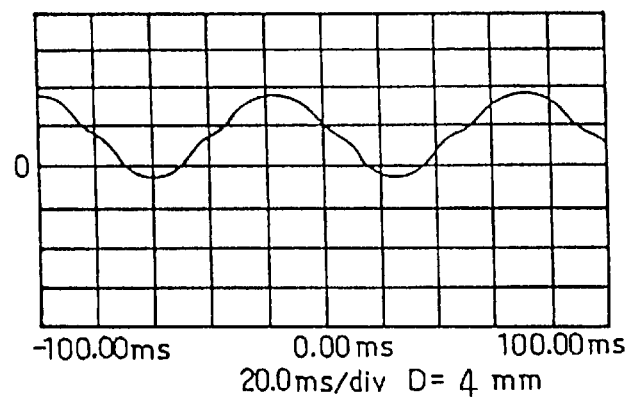
Figure 4D:
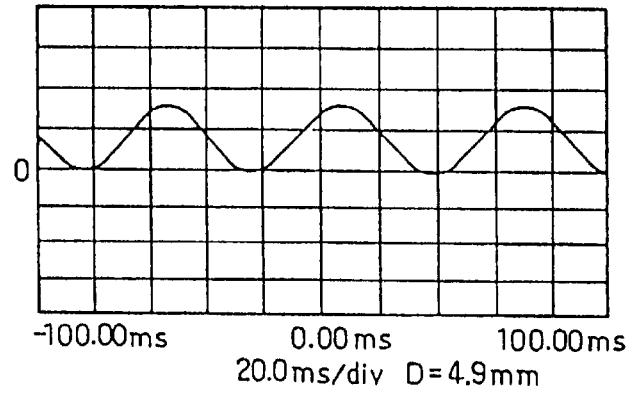

FIG. 3 shows a relation between the position of the magnetic sensor and the irregular magnetic fluxes near the intersection of the magnetic pole portions 8a.

In the space on the outer periphery of the rotor 8, there is a magnetic flux indicated by code W0 which gets out from the leading end face of the rotor magnetic pole portion 8a having N pole and reaches the leading end face of the rotor magnetic pole portion 8a having S pole. On the other hand, at the end face of the rotor, there is a magnetic flux indicated by code W1 which continues from N pole to S pole of the field permanent magnets 11. And, between the adjacent rotor magnetic pole portions 8a, there is a magnetic flux W2 which gets out from the end face of the leading end of the rotor magnetic pole portion 8a having N pole and reaches the leading end face of the rotor magnetic pole portion 8a having S pole. As shown in FIG. 3, this magnetic flux W2 passes an irregular route which separates from the rotor end face 8b, approaches to the rotor end face 8b and separates again to reach the leading end of the neighboring rotor magnetic pole portion 8a having S pole. This irregular magnetic flux W2 has a large irregularity when being close to the rotor end face 8b, and a magnetic flux W3 separated from the rotor end face 8b has a smooth shape like a parabola.

The magnetic sensor 16 of this embodiment is disposed at a position to separate from the rotor end face 8b in such a degree that it does not cross the above irregular magnetic flux W2 and to approach the rotor end face 8b in such a degree that it crosses the above smooth-shaped magnetic flux W3.

In this case, a gap between the above irregular magnetic flux W2 and the parabola magnetic flux W3 is largest at the bottom M0 of the groove M of the rotor 8, and the bottom M0 of the groove is substantially aligned with the relative trajectories of rotation A, A' of the magnetic sensor 16. Therefore, it is most convenient for the magnetic sensor 16 to detect a noiseless detection signal The action of this embodiment will be described based on the above structure.

The magnetic sensor 16 of this embodiment is positioned outside of the irregular magnetic flux W2 between the field permanent magnets 11 and crosses the smooth-shaped magnetic flux W3, so that it can detect a position of the peak point of the magnetic flux density around the rotor 8 without producing a noise by an effect of an irregular portion of the magnetic flux.

FIG. 4 shows the comparison of analogue signals of magnetism detected by the magnetic sensor 16 with a distance D between the magnetic sensor 16 and the rotor end face 8b varied. In FIGS. 4(a), (b), (c) and (d) show a lapse of time on the horizontal axis with respect to brushless motors having a distance D of 2 mm, 3 mm, 4 mm and 4.9 mm, respectively. The irregular uneven spots indicated by points a0, a1 in FIG. 4 (a) show the effect of the irregular magnetic flux W2 between the above field permanent magnets 11. The irregular uneven spots of the analogue signals of magnetism become a noise in the electric signal when converted into a digital signal. When this noise is large, the stator magnetic pole portion 9a cannot be excited appropriately, and the rotor 8 cannot be rotated smoothly.

It is clear by comparing FIG. 4 (a) to FIG. 4 (d) that the irregular uneven spots of the analogue signal of magnetism decreases as the distance D increases, detection can be made when the distance D is about 4 mm or more, and as shown in FIG. 4 (d), when the distance D is about 4.9 mm, the analogue signal of magnetism by the magnetic sensor 16 shows a smooth sine curve and is converted into a digital signal without many noises.

When the rotor 8 rotates in the direction R shown in FIG. 3, magnetic fluxes W0, W1, W2, W3 of the rotor 8 are attracted toward the direction R' shown in the same drawing by the interaction with the stator magnetic pole portion 9a. The angles of lead of the magnetic fluxes W0, W1, W2, W3 relate to the motor current or torque, and it is known that the angle of lead is increased as the motor current is increased. In this embodiment, the magnetic sensor 16 directly detects the magnetic flux density in the external space of the rotor end face 8b, so that the position of a peak point of the magnetic flux density can be detected. Thus, the stator magnetic pole portion 9a optimum to generate a rotary force most corresponding to the peak point of the magnetic flux density can be excited, and the motor efficiency can be improved.

In this embodiment, when the brushless motor was operated using a Hall element as the magnetic sensor under conditions of a distance D of 4.9 mm, a rotating speed of 1200 rpm and torque of 0.24 kgm, the motor efficiency was improved by about 10% as compared with a conventional brushless motor having a magnet piece to be detected.

This embodiment can also use a Hall IC as the magnetic sensor. The Hall IC is one IC combining a function of detecting the direction of a magnetic field using the Hall effect and the function of an amplifier. When N pole is approached to above the Hall IC, output is about 5 (V), and when S pole, output is 0 (V), thus it is a detecting element resistant to an electrical noise. When the Hall IC is used as the magnetic sensor, the motor efficiency can be improved by setting the distance D smaller than in using the Hall element by virtue of a hysteresis property of the Hall IC. The motor efficiency of the brushless motor using the Hall IC as the magnetic sensor under conditions of a rotating speed of 1200 rpm and torque of 0.24 kgm with the distance D varied is shown below.

| Distance between magnetic sensor and rotor end face D (mm) | Motor current (A) | Motor efficiency (%) |
| --- | --- | --- |
| 5.3 | 5.57 | 74.9 |
| 4.4 | 5.08 | 78.5 |
| 3.4 | 4.88 | 80.0 |
| 2.9 | 4.88 | 80.0 |
| 2.3 | 4.88 | 80.0 |

It is seen from the above that detection can be made when D is 2.3 mm or more, and 2.3–3.4 mm is optimum because the motor efficiency is stable.

On the other hand, when a brushless motor having a magnet piece to be detected was operated under the same conditions, a motor current of 7.40A and a motor efficiency of 63.2% were obtained. Specifically, using the brushless motor 1 of this embodiment using the Hall IC, the motor efficiency could be improved by up to about 17%.

Attachment of a nonmagnetic plate to the rotor end face can also reduce a magnetic noise.

Figure 5:
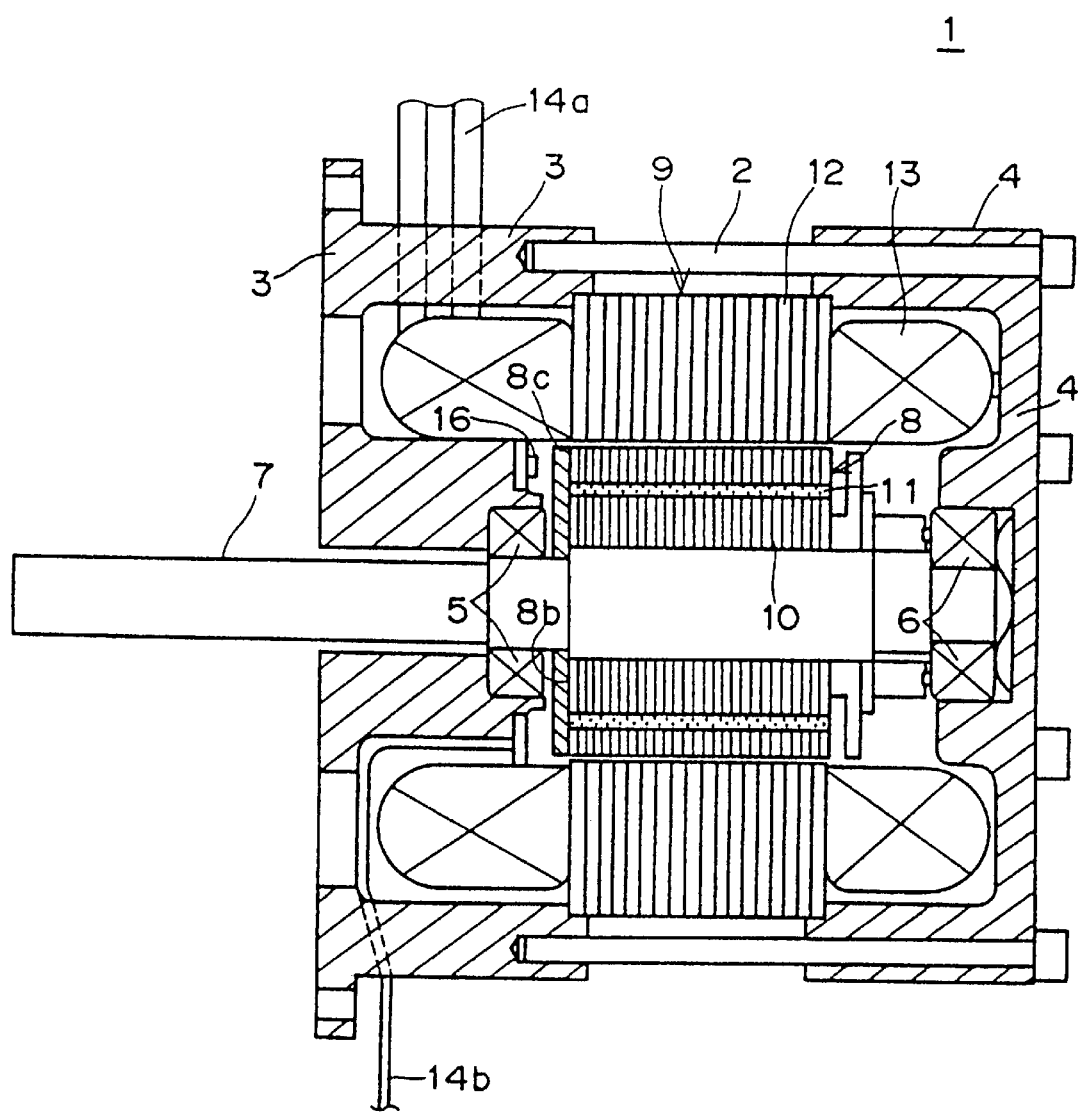
[FIG. 5] A vertical sectional view of the brushless motor of this invention with a nonmagnetic plate adhered to the rotor end face.

FIG. 5 shows a vertical sectional view of a brushless motor having a nonmagnetic plate attached to the rotor end face. Components same as those in FIG. 1 are given the same reference numerals and their description is omitted. In this embodiment, a nonmagnetic plate 8c made of stainless steel is adhered to the rotor end face 8b of a brushless motor 1. The adhesion of the nonmagnetic plate 8c to the rotor end face 8b converts a part of the magnetic flux leaked outside from the rotor end face 8b into an eddy current, so that the magnetic flux getting out of the nonmagnetic plate 8c has a smooth route as the whole. Since the route of the magnetic flux is smoothed, the analogue waveform of magnetism detected by the magnetic sensor 16 is smoothed, and converted into a digital signal without many noises.

FIG. 6 shows graphs of compared analogue waveforms detected by each magnetic sensor of a brushless motor having the nonmagnetic plate 8c and a brushless motor not having it.

FIG. 6 (a) shows analogue waveforms of magnetism of the brushless motor without the nonmagnetic plate, while FIG. 6 (b) shows analogue waveforms of magnetism of the brushless motor having the nonmagnetic plate adhered to the rotor end face. The horizontal axis in FIG. 6 shows time which is graduated in 5 ms, and three curves respectively correspond to analogue waveforms of U, V and W phases of the motor. In FIG. 6 (a), points N show an effect by irregular magnetic fluxes. These irregular analogue waveforms N make noises when converted into a digital signal. On the other hand, FIG. 6 (b) shows that the above irregular magnetic fluxes are converted into an eddy current by the nonmagnetic plate 8c, forming relatively smooth analogue waveforms, and a digital signal without many noises can be obtained.

In the above embodiment, the nonmagnetic plate 8c is adhered to the rotor end face 8b, but the nonmagnetic plate 8c may be positioned between the magnetic sensor 16 and the rotor end face 8b. For example, the nonmagnetic plate 8c may be attached to the surface of the magnetic sensor 16. Furthermore, addition of alumina material to the nonmagnetic plate 8c makes it easy to externally transmit the heat of the magnet, thereby contributing to prevent the thermal demagnetization of the magnet.

In the above description, the rotor has the field permanent magnets 11 inserted into the base of each rotor magnetic pole portion 8a. But, it is to be understood that this invention is not limited to the above but also applied to a rotor that the field permanent magnet is inserted into every other rotor magnetic pole portions so as to have the magnetic pole portions of alternate N and S poles in the circumferential direction by the repulsion of mutual field permanent magnets.

As obvious from the above description, according to the brushless motor of the first group of this invention, the magnetic sensor is disposed at a prescribed distance from the end face of the rotor to directly detect the magnetic flux of the field permanent magnets leaked outside from the rotor end face by the magnetic sensor, so that when the magnetic flux of the rotor during rotation is attracted in the rotating direction by the interaction with the magnetic pole portions of the stator or the angle of lead of the magnetic flux is varied depending on the motor current, the position of a peak point of the magnetic flux density in the external space of the rotor is always detected to excite the optimum magnetic pole portion of the stator, so that the motor efficiency can be improved. And, by the same action, the optimum stator magnetic pole portion can be excited by the magnetic sensor in the brushless motor which rotates in both directions.

And, according to the brushless motor of this invention, the magnetic sensor is positioned outside of the irregular magnetic flux between the field permanent magnets of the rotor, and to cross the smooth-shaped magnetic flux, so that a noise due to the irregular magnetic fluxes can be reduced, and the magnet piece to be detected which has been required heretofore can be omitted, enabling to obtain a simple-structured brushless motor.

Now, the brushless motor of the second group of this invention will be described.

The brushless motor of the second group basically has the same structure with the one shown in FIG. 1 and, therefore, the same components are given the same reference numerals and their description is omitted. In the brushless motor of the first group, the space between the rotor end face and the magnetic sensor has been considered. On the other hand, in the brushless motor of the second group, the positional relation of the magnetic sensor in a radial direction will be mainly considered.

Figure 7:
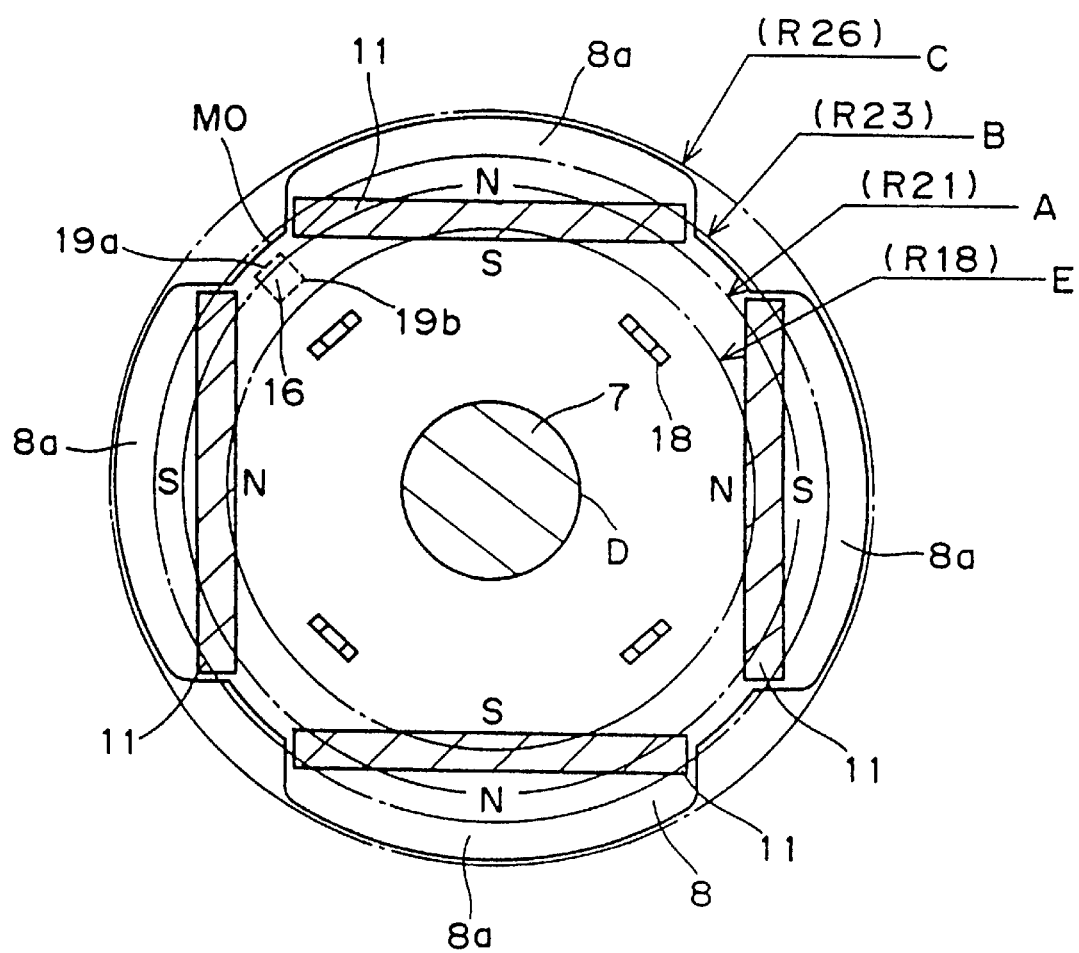
[FIG. 7] A front view showing a rotor of the brushless motor of this invention.

FIG. 7 shows an end face 8b of the rotor 8 of this invention. The rotor 8 consists of rotor magnetic pole portions 8a protruded outward in the radial direction at an angle of 90 degrees, and the field permanent magnets 11 inserted into the rotor magnet pole portions 8a. The field permanent magnet 11 has its length in its axial direction equal to or shorter than the length of the rotor 8, and the magnet end face is positioned at least the inside of the rotor end face 8b on the magnetic sensor side. When the magnet end face is protruded from the rotor end face, the magnetic sensor cannot detect a leaked magnetic flux, and a space between the rotor end face 8b and the magnetic sensor cannot be kept. Furthermore, it is revealed that the rotor end face 8b is preferably equal to or longer than the stator end face 9b because the leaked magnetic flux is increased and easily detected. At the center of the rotor 8, the rotatable shaft 7 is inserted, and the rotatable shaft 7 and the rotor 8 are integrally fixed by shrinkage fitting.

The field permanent magnets 11 are inserted in the bases of the rotor magnetic pole portions 8a so that N and S poles are alternately positioned to face outside. The magnetic flux of the field permanent magnets 11 is guided by the leading end of the rotor magnetic pole portion 8a, and gets in or out of the outer peripheral face of each rotor magnetic pole portion 8a. In this structure, the magnetic pole portions 8a of the rotor 8 are alternately magnetized in the N and S poles in the circumferential direction. An area between imaginary lines A-B in the figure (in this case, a distance R from the center axis is from 21 mm to R23 mm.) indicate an area that when a top 19a of the magnetic sensor 16 (in this case, a Hall IC) enters this area by the rotation of the rotor 8, the leaked magnetic flux from the rotor end face is detected and the motor can be driven. This imaginary line B is generally located on a circle with a radius which is at the midpoint between the outer wall of the field magnet 11 and the outer end of the rotor 8 regardless of the size of the motor.

On the other hand, an area between imaginary lines B-C in the drawing (in this case, a distance from the center axis is from R23 mm to R26 mm.) indicates an unstable area of the leaked magnetic flux present on the outer periphery of the rotor 8. The leaked magnetic flux in the unstable area is constantly varied unstably by an effect of a rotating field generated by the stator 9, and although the motor rotates, the motor efficiency at the operation range of low rotation and low torque results in inferior by about 4% than in the trajectory A-B. Furthermore, an area between imaginary lines A-D (in this case, a distance from the center axis is from R8 mm to R21 mm.) indicates an unstable area present on the inner periphery of the rotor 8. In the leaked magnetic flux in this unstable area, a magnetic flux between the field permanent magnets is hardly leaked and attracted by a magnetic field generated by the stator 9 in the groove M0, making a switching section of the magnetic flux unstable. Thus, the motor cannot be rotated.

In the drawing, an imaginary line E indicates a limit line that the magnetic sensor can driven normally when a bottom 19b of the magnetic sensor (Hall IC) 16 is outside of the imaginary line E. And, when the caulking sections 18 are between the imaginary lines E and D, the leaked magnetic flux from the rotor end face can be correctly detected but, when the caulking sections 18 are outside of the imaginary line E, the leaked magnetic flux from the rotor end face becomes unstable due to the unevenness of the caulking sections, and particularly the switching section of the magnetic flux becomes unstable. Therefore, a signal of the magnetic sensor cannot be adopted.

As shown in the drawing, by setting the top 19a of the magnetic sensor (Hall IC) 16 in the area A-B of the rotor and the caulking sections 18 inside the imaginary line E, a stable magnetic flux can be obtained, and stable efficiency and rotation can be obtained.

In the above embodiment, as the range that the magnetic sensor 16 can detect the leaked magnetic flux from the rotor end face and the motor can be driven, the area between the imaginary lines A-B in FIG. 7 has been taken, and the specific numerical values "21 mm" and "23 mm" have been shown to indicate that the area A-B is an area with a distance R from the center axis is from 21 mm to R23 mm. The above description does not mean that the area A-B is not limited to the above numerical values. More specifically, the area A-B as an area that the motor can be driven is to be understood in a relative positional relation between the outer diameter (about R26 mm) of the rotor 8 and the field permanent magnets 11. And, when a vertical line is assumed from the center axis to the field permanent magnet 11, it is revealed that the line A indicates almost the outer wall of the field permanent magnet 11 and the line B indicates almost the middle of the line A in the above assumed vertical line and the rotor outer end. These positions are generally appropriate positions whatever size the motor shape may have.

And, when the Hall IC is set to the above position (R23 mm), a rotating speed is fixed at 1200 rpm, and torque is varied, the deviation of the peaks of the magnetic flux density outside of the rotor and the signal of the Hall IC obtained from the rotor end face at the maximum efficiency with respective torque is as follows.

| Torque (Kgm) | Deviation of Hall IC and peaks of magnetic flux density (electrical angle) | Maximum efficiency (%) |
| --- | --- | --- |
| 0.05 | 10° ± 15° | 90 |
| 0.10 | 10° ± 15° | 87 |
| 0.15 | 10° ± 15° | 85 |
| 0.20 | 10° ± 15° | 82 |
| 0.25 | 10° ± 15° | 79 |

It is seen from the above table that when torque is 0.05 Kgm for example, it is necessary to make the deviation of a signal of the Hall IC and the peak of the magnetic flux density outside the rotor 10°±15° (electrical angle) to obtain the maximum efficiency 90% and, similarly, when torque is 0.10 Kgm, it is necessary to make the deviation of a signal of the Hall IC and the peak of the magnetic flux density outside the rotor 10°±15° (electrical angle) to obtain the maximum efficiency 87% (the same as above).

As obvious from the above table, when the position of the magnetic sensor board is set at a low load point (e.g., the above 0.05 Kgm) by directly detecting the leaked magnetic flux from the rotor end face, the maximum efficiency can be obtained under respective loads, the maximum efficiency has less change with respect to the mounting error of the Hall IC in the rotating direction, and the deviated degree is same regardless of the load, so that setting can be made under any load.

Specifically, when the rotor 8 rotates, the magnetic flux of the rotor magnetic pole portion is attracted by the interaction with the stator magnetic pole portion. This angle of lead relates to the motor current or torque, and the angle of lead is increased as the motor current is increased (as the torque is increased). And, the Hall IC directly detects the magnetic flux in the external space of the rotor end face 8b, so that the stator magnetic pole portion 9a optimum to generate a rotary force most corresponding to the peak point of the magnetic flux density can be excited, and the motor efficiency can be improved.

Figure 8:
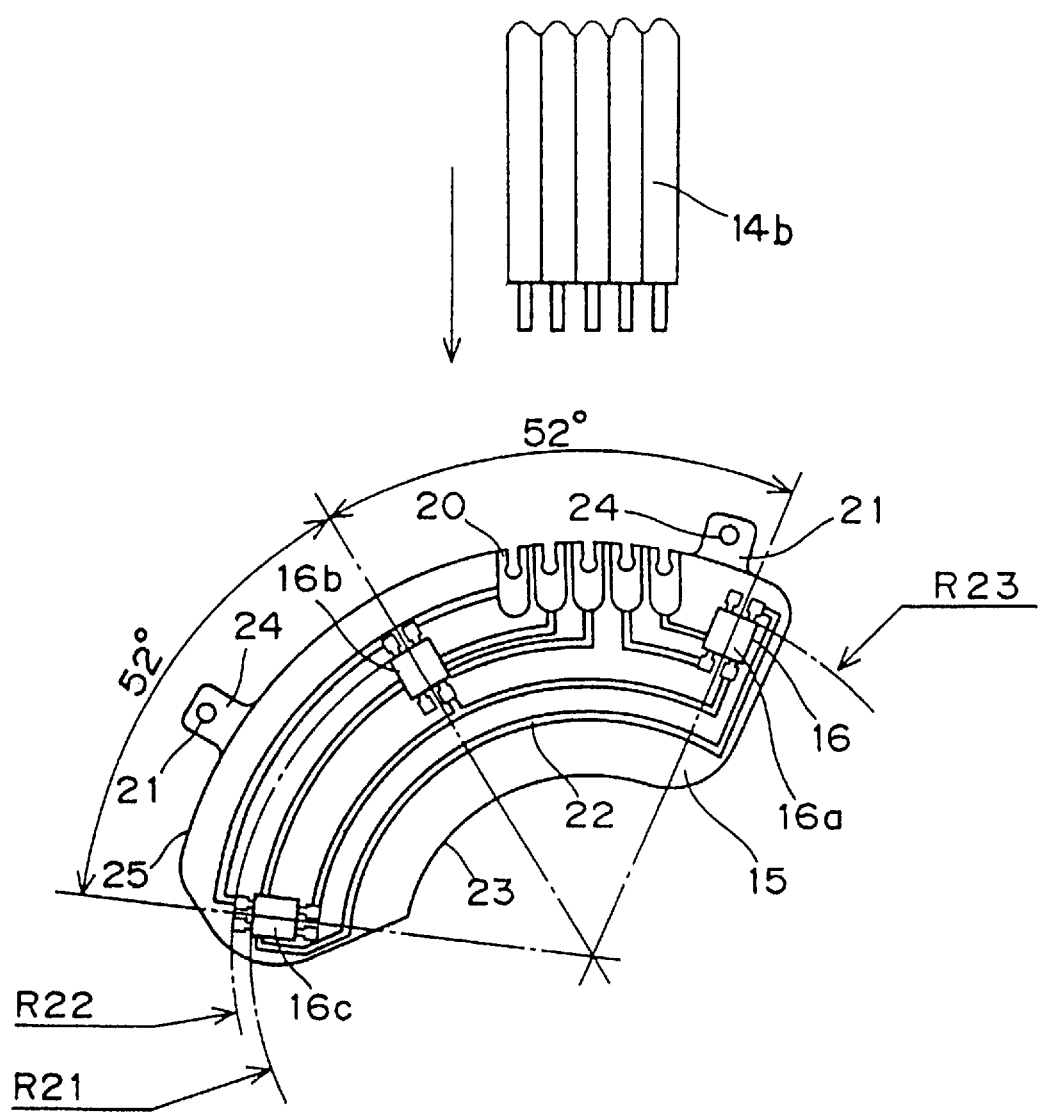
[FIG. 8] A magnetic sensor board diagram of the three-phase four-pole brushless motor of this invention.

FIG. 8 is a view showing a magnetic sensor board 15 of the three-phase four-pole brushless motor of this invention. In this embodiment, a Hall IC is used for the magnetic sensor.

Assuming that the rotor is rotated clockwise, a Hall IC 16a (the top end of the Hall IC is R23 mm from the center axis in this embodiment), a Hall IC 16b (R22 mm form the center axis in this embodiment) and a Hall IC 16c (R21 mm from the center axis in this embodiment) are set at different distances from the center axis at intervals of 52 degrees in the peripheral direction and displaced inward toward the rotating direction of the rotor, and soldered for fixing. Furthermore, two shaft mounting holes 21 for fixing the magnetic sensor board 15 to the stator are disposed at the outer end of the magnetic sensor board. A land 24 is applied around the mounting holes 21, and the land 24 has a thick copper foil to retain a sufficient mechanical strength after inserting a shaft and soldering or fixing with a resin. Furthermore, C-shaped lands 20 are disposed as connections to drive the Hall ICs or to externally output a signal, a lead 14b can be easily inserted vertically and horizontally in the magnetic sensor board, and the lands 20 have partly a wide area to allow soldering. The lead 14b is a flat cable having a one-body insulator for lines, so that it can be quite easily inserted in a C-shaped material such as the lands 20.

The magnetic sensor board 15 has a size such that its outer periphery 25 is positioned inside the stator coil 13 and its inner periphery 23 can be positioned arbitrarily. In other words, since the magnetic sensor board is fixed using the outer periphery, it is not necessary to use the inner periphery as the reference to fix to the housing member. And, the board can be made broad toward the outer diameter of the rotatable shaft 7. As a result, a pattern 22 can be formed easier, an insulated space between the patterns can be secured sufficiently, it is not necessary to draw the pattern outside of the lands 20, and the lands 20 can be formed in an open type like a letter C. Furthermore, since the angle in the rotating direction is sufficient in a size between the pitches of the Hall IC as described afterward, the size of the magnetic sensor board 15 becomes very compact and its production cost is low.

Figure 9:
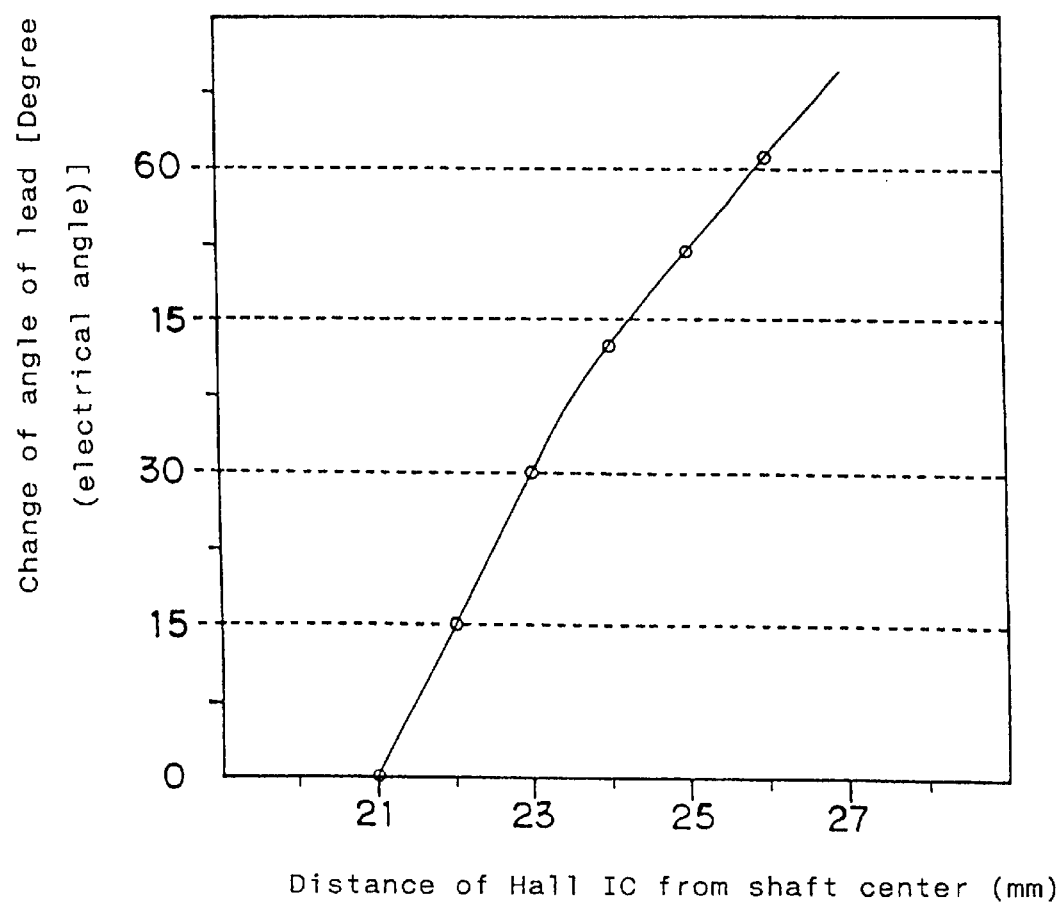
[FIG. 9] A graph showing the relation between an angle of lead and a distance from the shaft center of a Hall IC.
Figure 10:
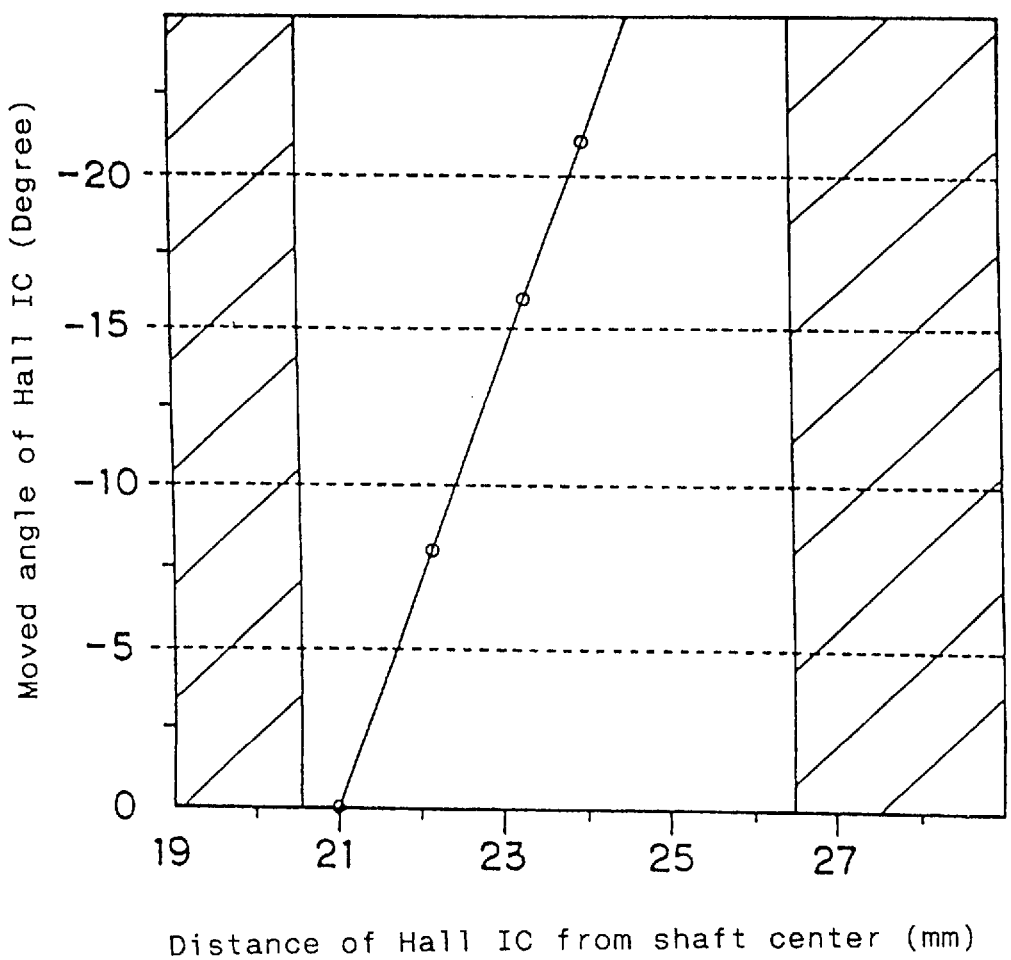
[FIG. 10] A graph showing the relation between a distance from the shaft center of a Hall IC and a moving angle of the Hall IC for obtaining the maximum efficiency.

FIG. 9 shows the variation of an angle of lead when the Hall IC 16 is moved outward from the shaft center with a position of R21 mm from the shaft center as the reference. FIG. 10 shows a moving angle of the Hall IC in the rotating direction to obtain the maximum efficiency when the Hall IC is moved outward with R21 mm from the shaft center as the reference.

In FIG. 8 to FIG. 10, determining an angle in the rotating direction of the rotor to be (+) and an angle in the counter-rotating direction of the rotor to be (−), when the Hall IC is simply moved outward from R21 mm to R23 mm, the rotor detection position is proportionally on the advancing side because a magnetic flux close to the stator, which is a leaked magnetic flux to be attracted, is picked up as seen in FIG. 9. But, after passing R23 mm, an advancing degree tends to decrease gradually because the shape of the magnetic pole portion is limited. And, when the Hall IC is moved outward from R21 mm to R26 mm, the angle of lead is excessive, deviating the position of the maximum efficiency of the angle of lead, and the motor efficiency is lowered. But, as seen in FIG. 10, it was experimentally found that when the Hall IC was moved to the (−) side, the maximum efficiency was obtained at respective positions and the obtained maximum efficiencies were substantially not different. When the Hall IC is at R20.5 mm or below or R26.5 mm or more from the shaft center, the motor does not rotate. Therefore, the applicable areas in the drawing are hatched.

With the Hall IC 16c (R21 from the shaft center) as the reference, the Hall IC 16b (R22 from the shaft center) is positioned normally at an angle of 60 degrees. As shown in FIG. 9, when the position is 1 mm outside from the shaft center, the electrical angle advances by 15 degrees. On the other hand, as shown in FIG. 10, when the rotational angle of the Hall IC is moved, the same maximum efficiency can be obtained, and 60°–8°=52° becomes an angle between the Hall IC 16c and the Hall IC 16b. Similarly, an angle (52°) is obtained between the Hall IC 16b and the Hall IC 16a. As a result, a distance between the Hall ICs could be narrowed by 16° as compared with prior art, and the magnetic sensor board 15 could be made compact.

Figure 11:
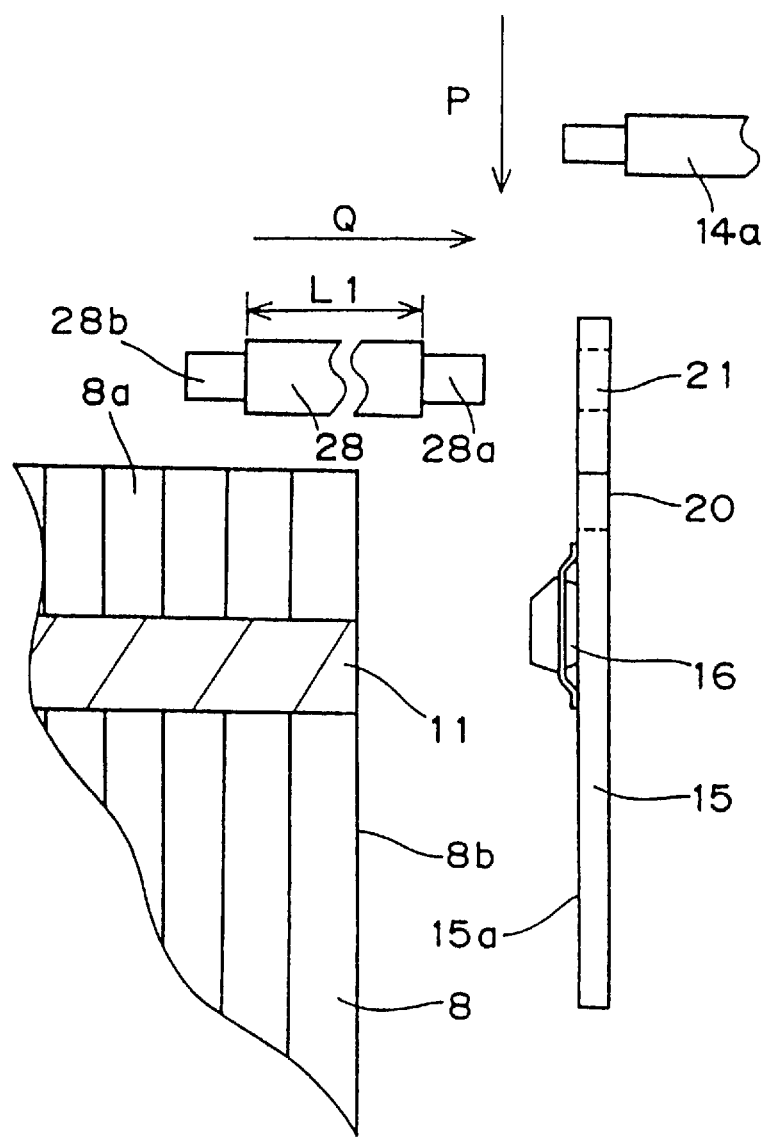
[FIG. 11] A side view of the Hall IC and the rotor end face of this invention.

FIG. 11 is a side view of the Hall IC and the rotor end face. To detect a magnetic flux leaked from the magnetic pole portion 8a in the outside space of the rotor 8, the magnetic sensor (Hall IC) 16 disposed on the magnetic sensor board 15 is directed toward the rotor end face 8b, and a space between the rotor 8 and the magnetic sensor board 15 is adjusted with a stepped shaft 28. More specifically, one end 28a of the shaft 28 is inserted into the mounting hole 21 of the magnetic sensor board in a direction Q and soldered on a land side 15a. Another end 28b is forced into the stator magnetic pole portion (not shown) and fixed. The space between the rotor end face and the Hall IC is adjusted according to a size L1 of the shaft 28. In this embodiment, when the axial distance between the rotor end face and the Hall IC is less than 2.3 mm, many magnetic fluxes leak from the rotor end face, so that normal operation cannot be made. Therefore, the size L1 is set to be 2.3 mm or more.

And, it was experimentally found about the magnetic flux that a thickness of the field permanent magnet is proportionally related with the space between the rotor end face and the Hall IC. Specifically, as the field permanent magnet becomes thicker, the leaked magnetic flux from the field permanent magnet increases and, even if the Hall IC is separated from the rotor end face, sensing can be made. Furthermore, the lead 14b is inserted into the land 20 from a top face P of the magnetic sensor board 15 and fixed by soldering or with a resin.

Figure 12:
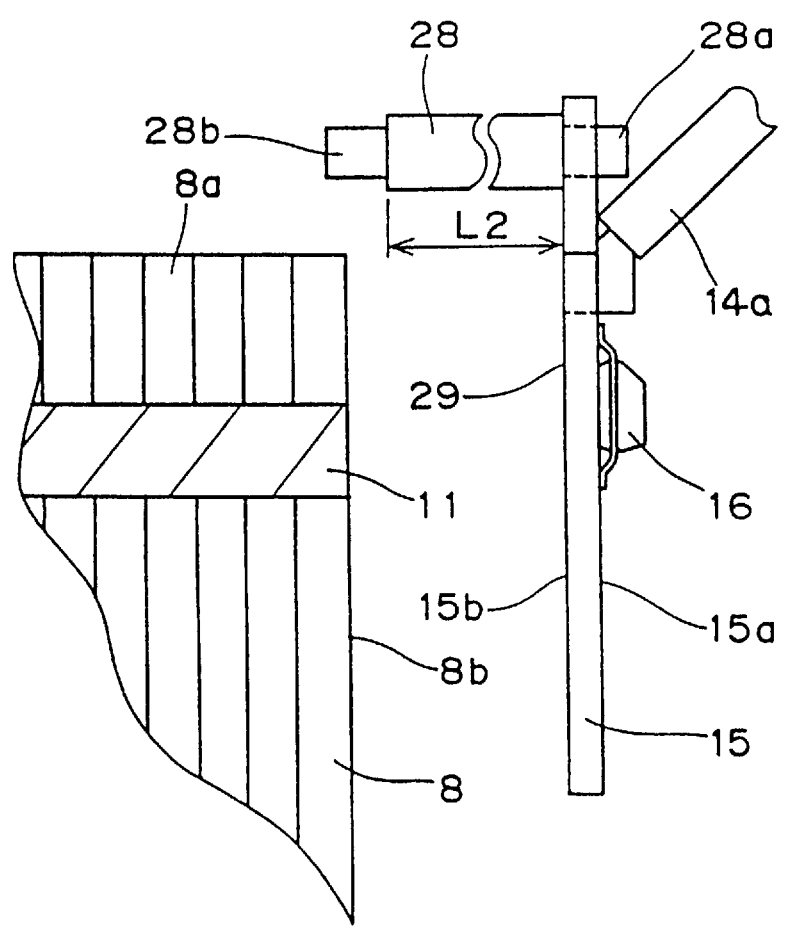
[FIG. 12] A side view of the Hall IC and the rotor end face of another embodiment of this invention.

FIG. 12 is a side view showing another embodiment of the Hall IC and the rotor end face. In this case, the magnetic sensor board 15 and the magnetic sensor (Hall IC) 16 are disposed to face opposite from the above embodiment. The space between the rotor 8 and the magnetic sensor board 15 is adjusted according to a size L2 of the stepped shaft 28, and the mounting space of the Hall IC is equal to the size L2. Furthermore, since the shaft end 28a is inserted in the opposite direction and soldering is made in the opposite direction, or the land side 15a is faced to the opposite direction from the end face 8b, soldering to the land side 15a is made easy.

And, the lead 14b is soldered as it is on a wide area of the land 20, and the soldered face and every parts such as the Hall IC are positioned on the land side 15a, making it easy to produce. To a counter-land side 15b, a shield sheet 29 is affixed to prevent a noise of the board from mixing with a noise of the leaked magnetic flux from the rotor end face. Therefore, the magnetic flux free from a noise can be fully detected by the Hall IC. Thus, the adhesion of the shield sheet 29 to the counter-land side allows to externally output a stable signal and also to measure a magnetic flux near by about 30% to the rotor end face as compared with the ordinary space between the rotor end face and the sensor board without providing the shield sheet 29.

Figure 13:
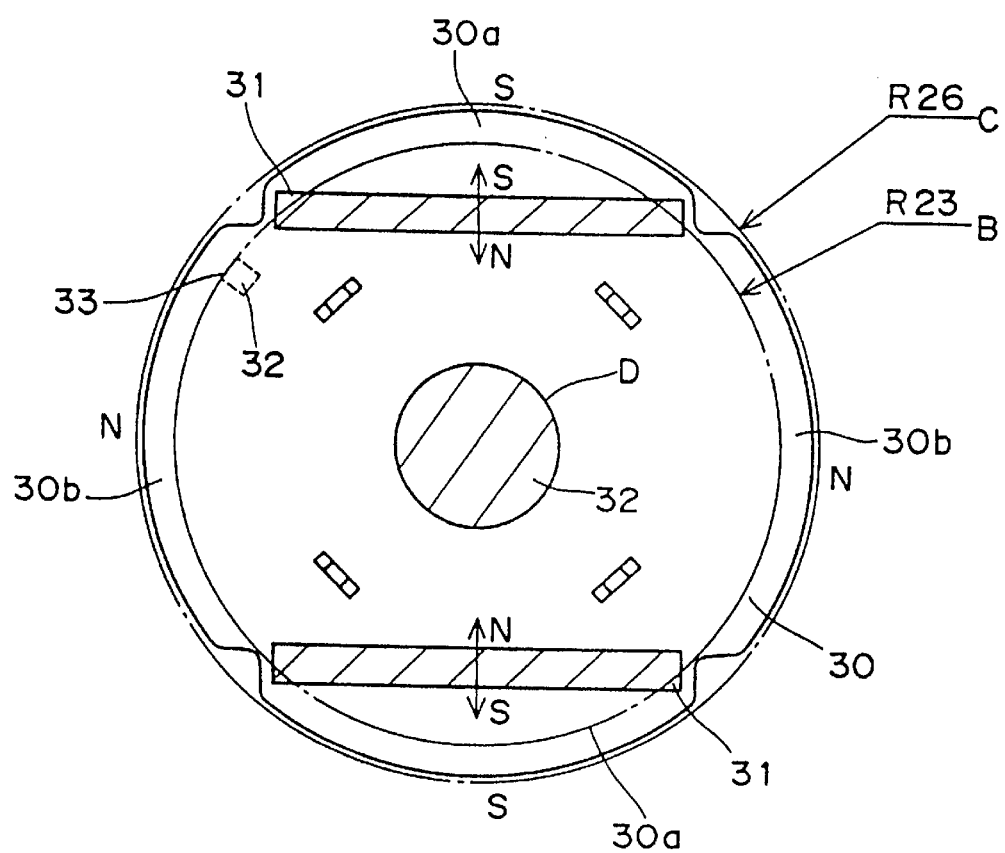
[FIG. 13] A view showing the front of a rotor of the brushless motor of another embodiment of this invention.

FIG. 13 shows another embodiment of the rotor end face.

A rotor 30 consists of rotor magnetic pole portions 30b radially protruded at an angle of 90 degrees and field permanent magnets 31 inserted into rotor magnetic pole portions 30a. At the center of the rotor 30, a rotatable shaft 32 is inserted, and the rotatable shaft 32 and the rotor 30 are integrally fitted by shrinkage fitting.

Each field permanent magnet 31 is inserted in the bases of every other magnetic pole portions 30a so that N pole (or S pole) is positioned on the rotatable shaft side. The magnetic fluxes of the field permanent magnets 31 are guided by the leading ends of the magnetic pole portions 30a to get in or out of the outer peripheral face of each rotor magnetic pole portion 30b. Thus, the rotor 30 is alternately magnetized in the N and S poles in the circumferential direction. An area between imaginary lines B-C in the drawing (in this case, a distance from the center axis is from R23 mm to R26 mm) indicates an area that when a top 33 of a Hall IC 32 enters this area by the rotation of the rotor 30, a magnetic flux switching section becomes stable and the motor can be driven.

Furthermore, an area between imaginary lines B-D (in this case, a distance from the center axis is from R8 mm to R23 mm) indicates an area that the rotor 30 is unstable. In this area, the magnetic fluxes of the magnetic pole portions having the field permanent magnet and not having have different movements, the magnetic flux switching section becomes unstable and the motor cannot be driven.

In the above description, a magnetic sensor signal has been explained to be taken from the magnetic flux leaked from the rotor end face, but this invention is not limited to it. When rare earth magnets having a high energy product (BHMAX25MGOe) are inserted in the rotor to cause magnetic saturation at one spot at a minimum on the rotor end face and a magnetic flux is leaked intentionally on the outside of the rotor, a quantity of magnetism which flows the magnetic sensor is increased, and detection can be made satisfactorily even when the magnetic sensor has variations in the property. In particular, when the magnetic saturation is close to a place where poles are switched, detention can be made stably at a spot liable to be unstable. Furthermore, it is to be understood that reliability of the motor is improved and assembling is facilitated by increasing the axial distance between the magnetic sensor and the rotor end face.

As obvious from the above description, according to the brushless motor of the second group of this invention, the magnetic sensor is disposed at a prescribed distance from the end face of the rotor to directly detect the magnetic flux of the field permanent magnets leaked outside from the rotor end face by the magnetic sensor, so that when the magnetic flux of the rotor during rotation is attracted in the rotating direction by the interaction with the magnetic pole portions of the stator or the angle of lead of the magnetic flux is varied depending on the motor current (motor torque), the position of a peak point of the magnetic flux density in the external space of the rotor is always detected to excite the optimum magnetic pole portion of the stator, so that the motor efficiency can be improved. In addition, the maximum efficiency has less change with respect to the mounting error of the Hall IC in the rotating direction, and the angle of lead is same regardless of the load, so that setting can be made under any load.

And, since the magnetic sensor board of this invention has the mounting holes for fixing the sensor board disposed at the outer periphery, the inner periphery of the sensor board can be widened to the rotatable shaft, the insulated space between the patterns can be secured sufficiently, and the shape of the connection land with the lead can be changed. As a result, the lead can be easily inserted and connected. And, changing of the distance of the Hall IC from the shaft changes the angle of lead, and the angle between the Hall ICs can be narrowed. As a result, the size of the magnetic sensor board can be made small, and the cost can be reduced.

The brushless motor of the third group of this invention will be described.

Figure 14:
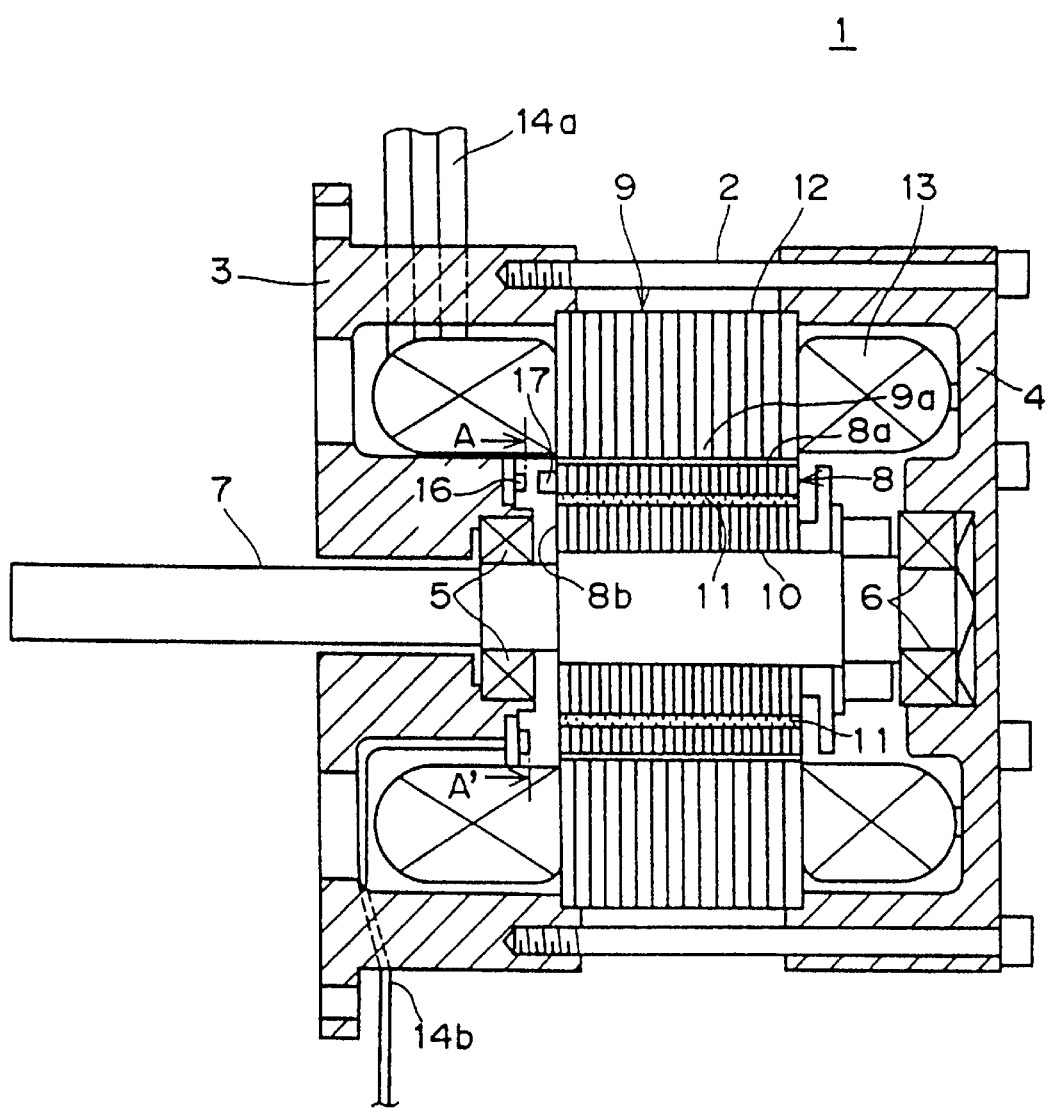
[FIG. 14] A vertical sectional view showing another embodiment of the brushless motor of this invention.

As shown in FIG. 14, the brushless motor of the third group basically has the same structure with the one shown in FIG. 1 and, therefore, the same components are given the same reference numerals and their description is omitted.

In FIG. 14, to an end face 8b of the rotor 8, a magnet piece 17 to be detected is attached to specify a rotational position of the rotor 8. To the inner end face of the housing member 3 near the trajectory of rotation of the magnet piece 17 to be detected, a CW magnetic sensor 16 (16X) for detecting a rotational position of the rotor 8 rotating clockwise and a CCW magnetic sensor 16 (16Y) for detecting a rotational position of the rotor 8 rotating counterclockwise are attached.

Figure 15:
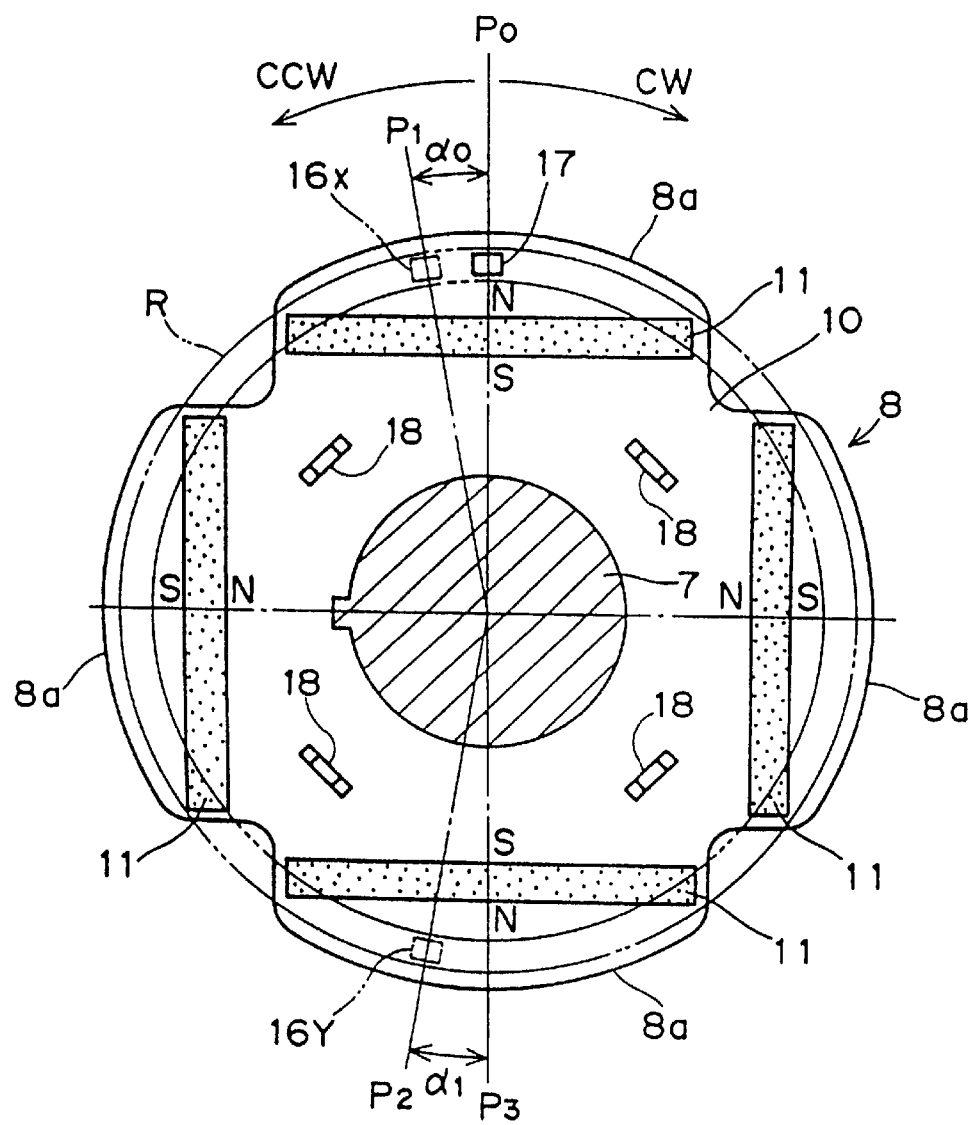
[FIG. 15] A sectional view taken on line A-A' of FIG. 14.

FIG. 15 shows the front of the rotor 8 taken on line A-A' shown in FIG. 14. The rotor 8 consists of the rotor yoke 10 made of the laminated steel plates and the field permanent magnets 11, and the rotor yoke 10 has four externally protruded sections in a radial direction at an angle of 90 degrees on its outer periphery. These four protruded sections of the rotor yoke 10 have the field permanent magnet 11 inserted in their bases so that N and S poles are alternately positioned to face outward to respectively form the rotor magnetic pole portion 8a. In the drawing, reference numeral 18 indicates caulking sections for integrally caulking the steel plates.

At the center of an end face of one of the rotor magnetic pole portions 8a, the magnet piece 17 to be detected is adhered. This magnet piece 17 to be detected moves along the trajectory of rotation R when the rotor 8 rotates clockwise CW or counterclockwise CCW as shown in FIG. 15. To an end face of the housing member 3 not shown, the CW magnetic sensor 16X and the CCW magnetic sensor 16Y which are indicated by an imaginary line are adhered. As shown in the drawing, the CW magnetic sensor 16X and the CCW magnetic sensor 16Y are disposed near the trajectory of rotation R, the CW magnetic sensor 16X is fixed as displaced by an angle of $\alpha 0$ in the CCW direction, and the CCW magnetic sensor 16Y is fixed as displaced by an angle of $\alpha 1$ in the CCW direction.

Assuming that the positions of the CW magnetic sensor 16X and the COW magnetic sensor 16Y are P1 and P2, respectively, and the center positions of the rotor magnetic pole portions 8a are P0 and P3, when the rotor 8 rotates clockwise, a control circuit not shown receives a signal of the CW magnetic sensor 16X only and controls to excite the stator magnetic pole portion 9a which corresponds to the position P0 when the CW magnetic sensor 16X detects a magnetic flux at the position P1. When the rotor 8 rotates counterclockwise, the above control circuit receives a signal of the CCW magnetic sensor 16Y only and controls to excite the stator magnetic pole portion 9a which corresponds to the position P3 when the CCW magnetic sensor 16Y detects the magnetic flux at the position P0.

Figure 38:
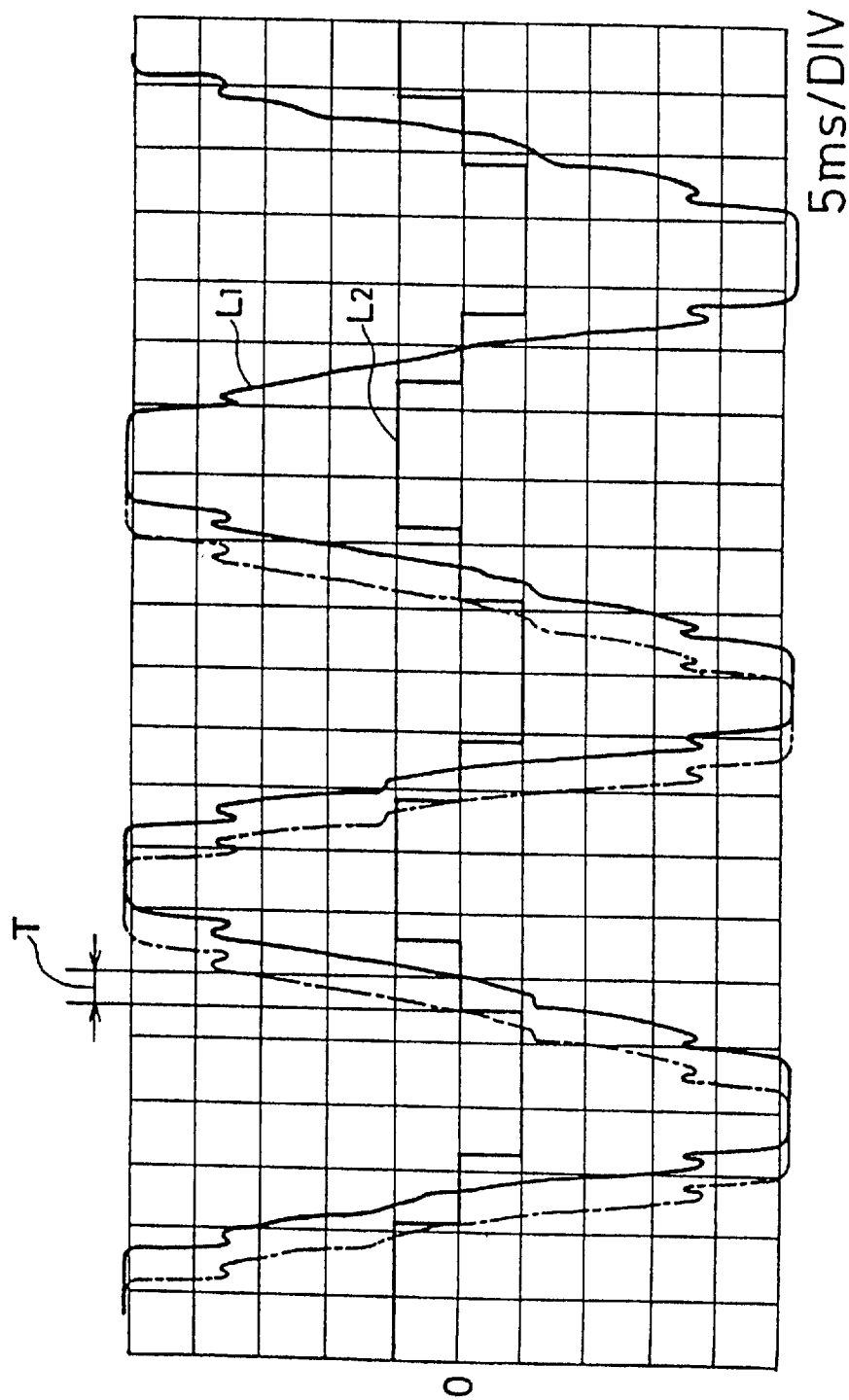
[FIG. 38] A graph showing a difference between a change of the magnetic flux density of a conventional brushless motor and the detected rotational position of the rotor.
Figure 39:
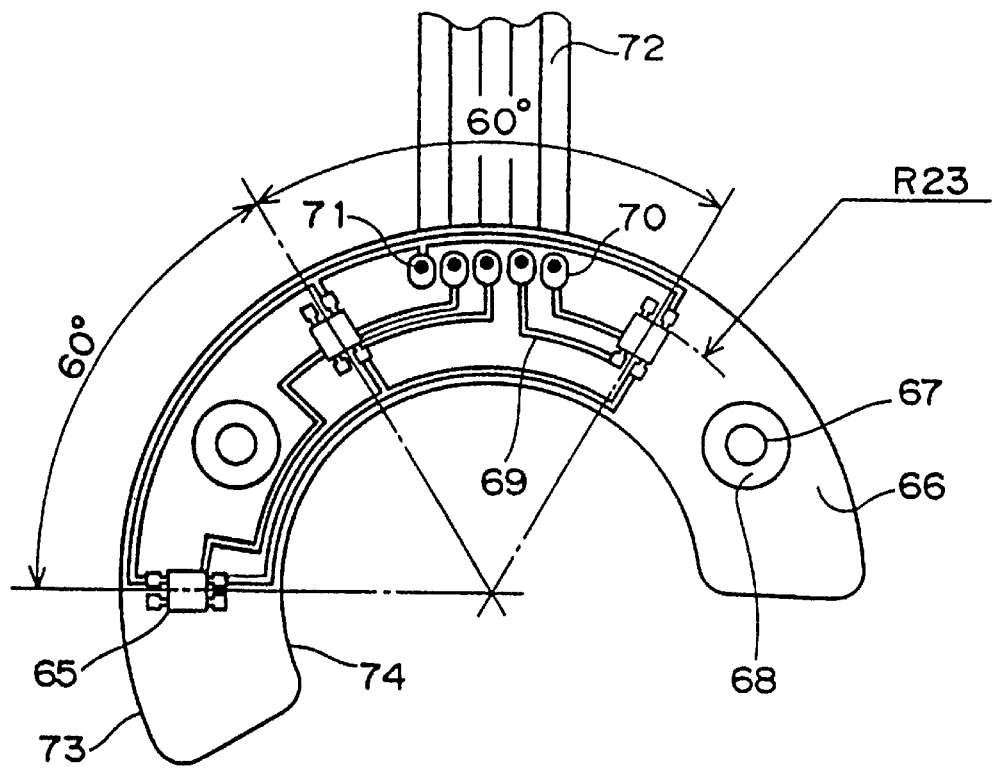
[FIG. 39] A view showing the magnetic sensor board of a conventional three-phase four-pole brushless motor.

Referring to FIG. 38, the sizes of the angles $\alpha 0$ and $\alpha 1$ will be described. As described above, FIG. 38 shows a difference between a change of the magnetic flux density in the outside space of the rotor end face of the brushless motor and the rotational position of the rotor detected by the magnet piece to be detected. And, the time difference T can be converted into a rotational angle of the rotor, and this rotational angle is equal to the angle of lead of the magnetic flux.

In view of the above, in this embodiment, the deviated angles $\alpha 0$ and $\alpha 1$ of the CW magnetic sensor 16X and the CCW magnetic sensor 16Y are set to be substantially equal to the angle of lead of the magnetic flux density.

By structuring as described above, in the brushless motor 1 of this embodiment, when the rotor 8 rotates clockwise CW as shown in FIG. 15, the CW magnetic sensor 16X detects the magnetic flux of the magnet piece 17 to be detected when the magnet piece 17 to be detected has reached the position P1, and the aforementioned control circuit excites the stator magnetic pole portion 9a corresponding to the position P0. At this time, since the peak point of the magnetic flux density in the outside space of the rotor 8 is at the position P1, the rotor 8 can be rotated most efficiently and, as a result, the motor efficiency can be improved.

Inversely, when the rotor 8 rotates counterclockwise, the CCW magnetic sensor 16Y detects the magnetic flux of the magnet piece 17 to be detected which has reached the position P2, and the stator magnetic pole portion 9a corresponding to the position P3 is excited. Thus, the motor efficiency can be improved in the same way.

In the brushless motor 1 of this embodiment, when the rotor 8 rotates clockwise CW as shown in FIG. 15, the CCW magnetic sensor 16Y can be used. More specifically, as described above, since the CCW magnetic sensor 16Y is fixed as displaced by the angle $\alpha 1$ in the CCW direction when rotated counterclockwise CCW, when this is seen from the viewpoint of rotating clockwise CW, the CCW magnetic sensor 16Y has an angle of delay. Therefore, when rotating CW, the CCW magnetic sensor 16Y can be used for an angle of delay. And, when rotating CCW, the CW magnetic sensor 16X can be used for an angle of delay.

For carrying equipment, a bidirectionally rotatable brushless motor, which needs to let out at a low speed and at high torque when working and to reversely rotate quickly at a high speed and at low torque when winding, is used. The bidirectionally rotatable brushless motor has different angles of lead of the magnetic flux density in respective rotating directions, and is provided with one magnet piece to be detected, a working magnetic sensor for detecting a rotational position of the rotor when working, and a winding magnetic sensor for detecting a rotational position of the rotor when winding; the working magnetic sensor is fixed as displaced by an angle equal to an angle of lead of the magnetic flux in an opposite direction with respect to the rotating direction of the rotor at high torque when working, and the winding magnetic sensor is fixed as displaced at a large angle in an opposite direction with respect to the rotating direction (opposite rotating direction from when working) of the rotor at low torque when winding. By matching with the angle of lead of the magnetic flux at each torque of the working and winding magnetic sensors, a bidirectionally rotatable brushless motor which has different rotating speed and torque, and high efficiency in each rotating direction can be obtained.

As obvious from the above description, the brushless motor of the third group of this invention has a magnet piece to be detected for specifying a rotational position of the rotor, a CW magnetic sensor for detecting a rotational position of the rotor rotating clockwise and a CCW magnetic sensor for detecting a rotational position of the rotor rotating counterclockwise, and since the CW magnetic sensor and the CCW magnetic sensor are disposed as displaced by a prescribed angle respectively in opposite directions with respect to a rotating direction of the rotor, when the rotor rotates in either direction, clockwise or counterclockwise, the stator magnetic pole portion advanced by an angle equal to an angle of lead of the magnetic flux than the actual rotational position of the rotor can be excited. Thus, the rotor can be rotated most efficiently, and a bidirectionally rotatable brushless motor having a high motor efficiency can be obtained.

Using the brushless motor of the second group of this invention, the bidirectional rotation like the brushless motor of the third group will be described.

Figure 17:
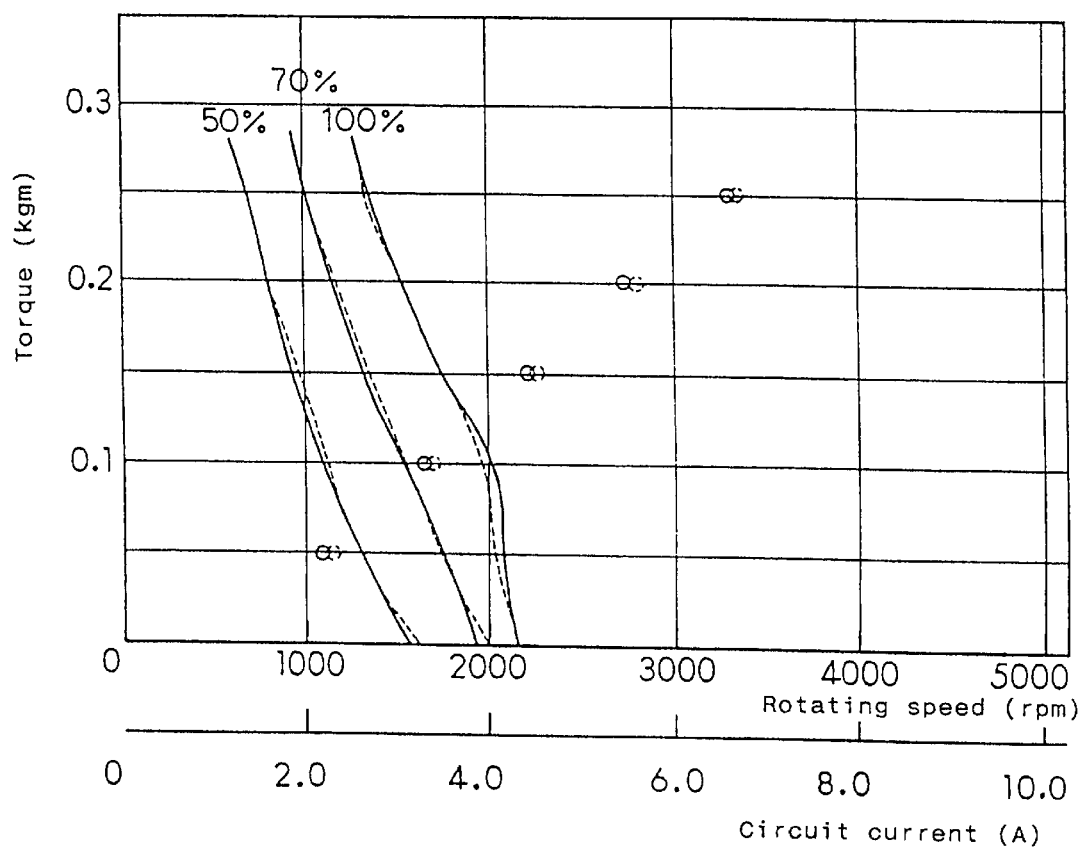
[FIG. 17] A graph showing the performance when the Hall IC is at a position of R23 mm.

As described above, since three magnetic sensors are generally required for the rotation in one direction, the bidirectionally rotatable brushless motor uses six magnetic sensors. As shown in FIG. 16, the inventors determined the rated efficiency, maximum load and maximum rotating speed, assuming the positions of a Hall IC to be 21 mm, 23 mm, 24.5 mm and 26 mm, at a position (angle of lead 0°) with the same efficiency when rotating clockwise (CW) and counterclockwise (CCW) using three sensors as one set. It is seen from FIG. 16 that sensing could not be made by the Hall IC with R24.5 mm and R26 mm. And, as shown in FIG. 17, in the case of R23 mm, when the same voltage is applied to rotate CW and CCW, the motor efficiencies are different, but the rotation has less variation through the full range, and net properties (maximum rotating speed) become same. Similarly, as shown in FIG. 18, in the case of R21 mm, when the same voltage is applied to rotate CW and CCW, the motor efficiencies and the rotating speeds under high load are same although net properties are different.

Figure 18:
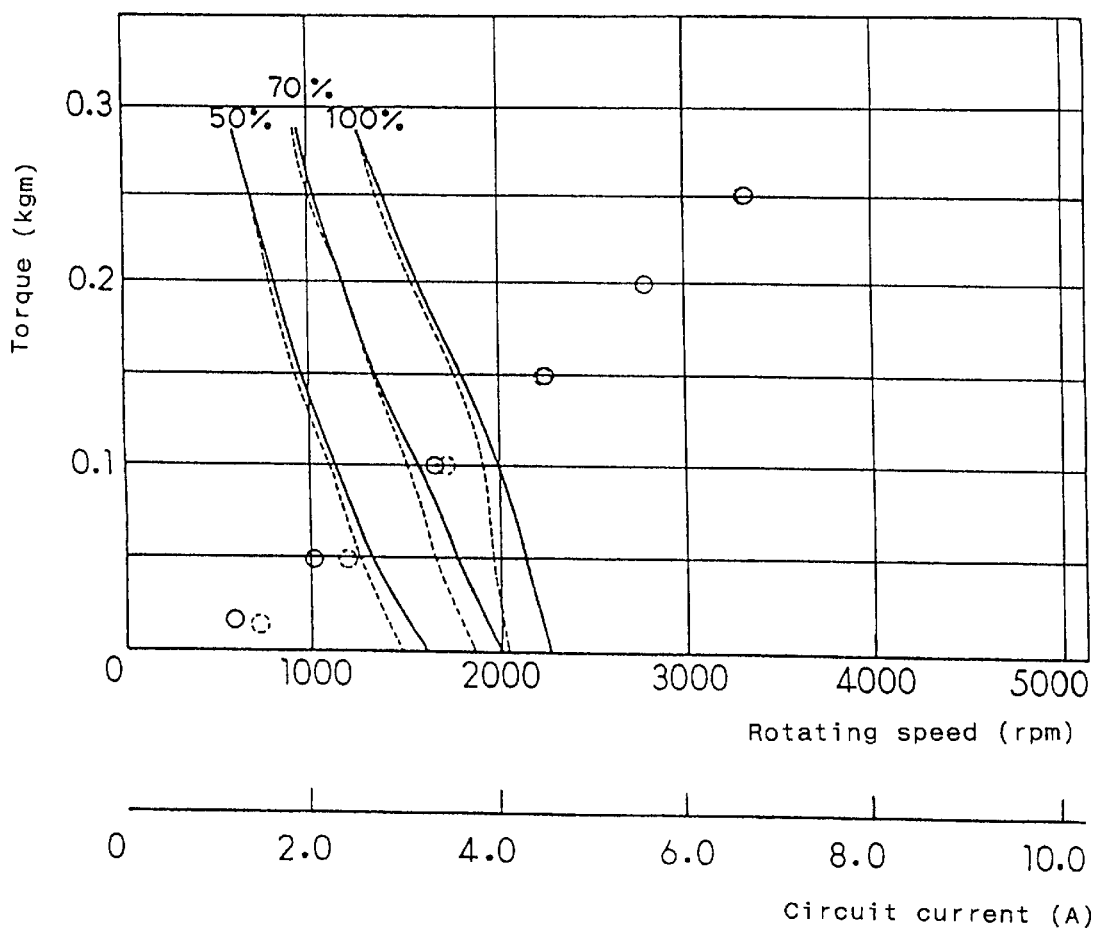
[FIG. 18] A graph showing the performance when the Hall IC is at a position of R21 mm.

In FIG. 17 and FIG. 18, 50%, 70% and 100% show the relation between the rotating speed and the torque by duty, and the circles show the relation between the circuit current and the torque. In the both drawings, the solid line indicates CCW and the dotted line indicates CW.

And, when the Hall IC is set to R23 mm, a rotating speed is fixed at 1200 rpm, and torque is varied, the deviation of the peaks of the magnetic flux density outside of the rotor and the signal of the Hall IC obtained from the rotor end face at the maximum efficiency with respective torque is as follows.

| Torque (Kgm) | Deviation of Hall IC and peaks of magnetic flux density (electrical angle) | Maximum efficiency (%) |
|---|---|---|
| 0.05 | 0° ± 5° | 90 |
| 0.10 | 0° ± 5° | 87 |
| 0.15 | 0° ± 5° | 85 |
| 0.20 | 0° ± 5° | 82 |
| 0.25 | 0° ± 5° | 79 |

It is seen from the above table that when set to R23 mm, the maximum efficiency has less change with respect to the mounting error of the Hall IC in the rotating direction, and the deviated degree is same regardless of the load, so that setting can be made under any load.

The above embodiment indicates that the arbitrary selection of the setting position of the magnetic sensor allows to obtain a motor having the performance suitable for use with the structure not changed. More specifically, when the same maximum rotation and the same torque are required for both rotations of normal and reverse, the magnetic sensor is set to, for example, the above R23 mm. And, in a washing mode, like a motor used for washing machines, when the performance such as rotating speed of 1200 rpm, torque of 0.24 kgm and rotation in both directions is required, and in a spin-drying mode, when the performance such as a rotating speed of 2000 rpm, torque of 0.05 kgm and rotation in one direction is required, magnetic sensor is set to, for example, the above R21 mm. The above description has been made with the Hall IC changed its position radially, and it is to be understood that the same effect can be obtained by adjusting the angle of lead at each R position.

It is seen from the above embodiment that it is preferable to select a pattern suitable for application at a desired rotation, like the above motor for washing machines, from the great number of data previously collected with rotating directions CW and CCW under the conditions that the magnetic sensor had its positions changed variously. In the above table, the deviation of the Hall IC and the peaks of the magnetic flux density is different from the table indicated in connection with the brushless motor of the second group, because the former reflects the results obtained by groping for conditions suitable for the bidirectional rotations of normal and reverse.

Now, devices which are used for the above brushless motors of the first to third groups of this invention to improve their performance will be described.

Figure 19:
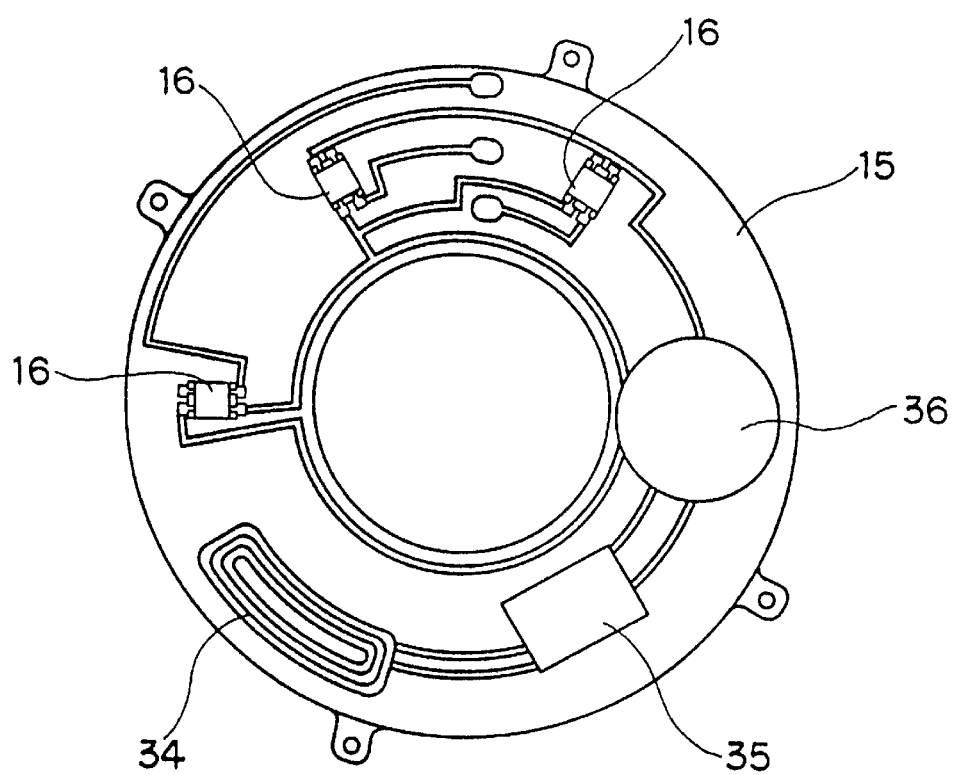
[FIG. 19] A view showing a magnetic sensor board.
Figure 20:
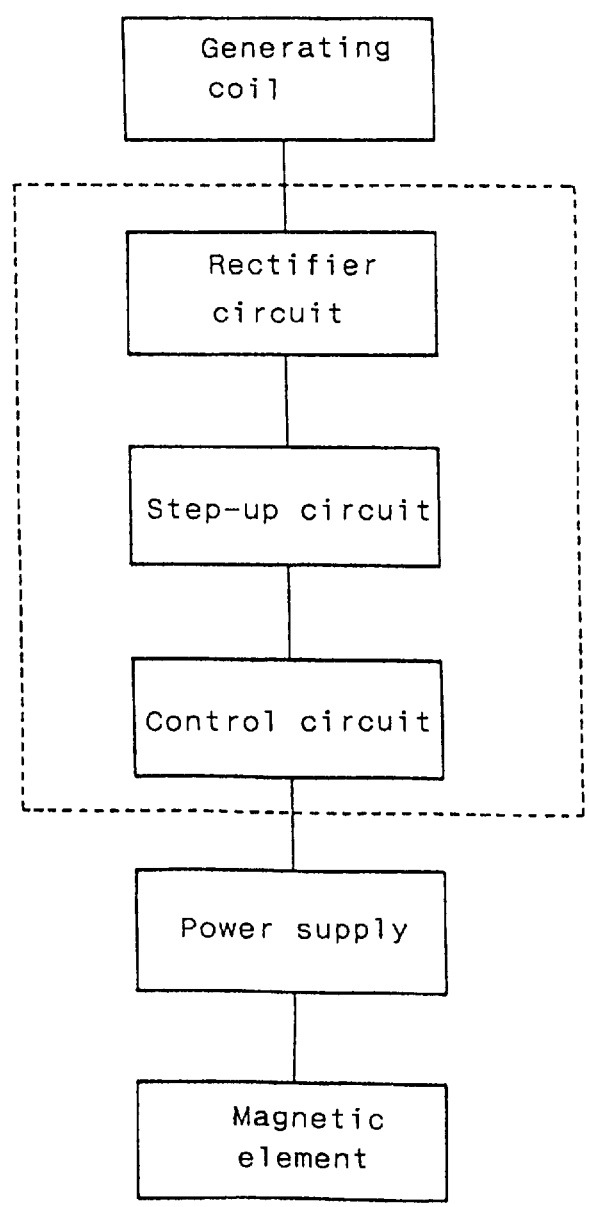
[FIG. 20] A block diagram of an electronic circuit.
Figure 21:
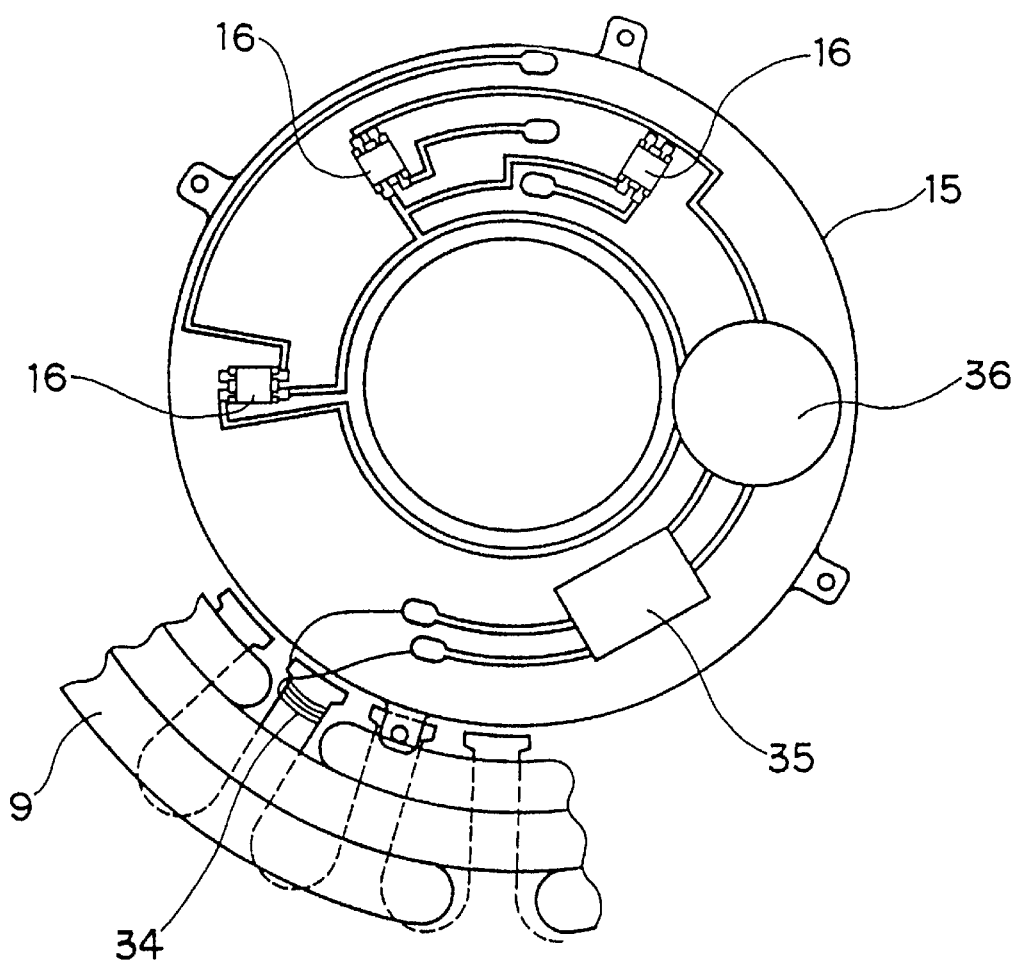
[FIG. 21] A view showing a magnetic sensor board and part of a stator.

FIG. 19 is a view showing a magnetic sensor board. This embodiment has a sensor driving power supply disposed on the magnetic sensor board 15. More specifically, a generating coil 34 is disposed on the magnetic sensor board 15, the generating coil 34 is connected with an electronic circuit 35 which is then connected with a power supply 36, and magnetic sensors 16 are connected. In this magnetic sensor board 15, an a.c. current passes through the generating coil 34 due to a leaked magnetic flux from the rotor, subjected to full wave rectification or half-wave rectification in a rectifier circuit, has a voltage stepped up in a step-up circuit, and stored in the power supply through a control circuit as shown in FIG. 20. As the control circuit, one or two or more diodes are used, and the step-up circuit is disposed as required and made of a step-up coil. When the magnetic sensor board 15 is structured as described above, the leaked magnetic flux from the rotor can be effectively used. And a conventionally used external power supply and an external wiring therefor can be eliminated. Thus, the magnetic sensor board 15 can have high generating capacity and be formed compact including the magnetic sensors and the power supply. Furthermore, as shown in FIG. 21, the generating coil 34 can be also formed by winding an auxiliary coil on a tooth portion of the stator 9. For the generating coil 34, a sheet coil which is suitable to make it small and thin is preferably used, and for the power supply 36, a high-capacity capacitor or a secondary battery which is rechargeable is used. In this way, generation can be made in a large volume, and via the electronic circuit power supply, electricity can be taken out of the motor to control an external actuator.

Figure 22:
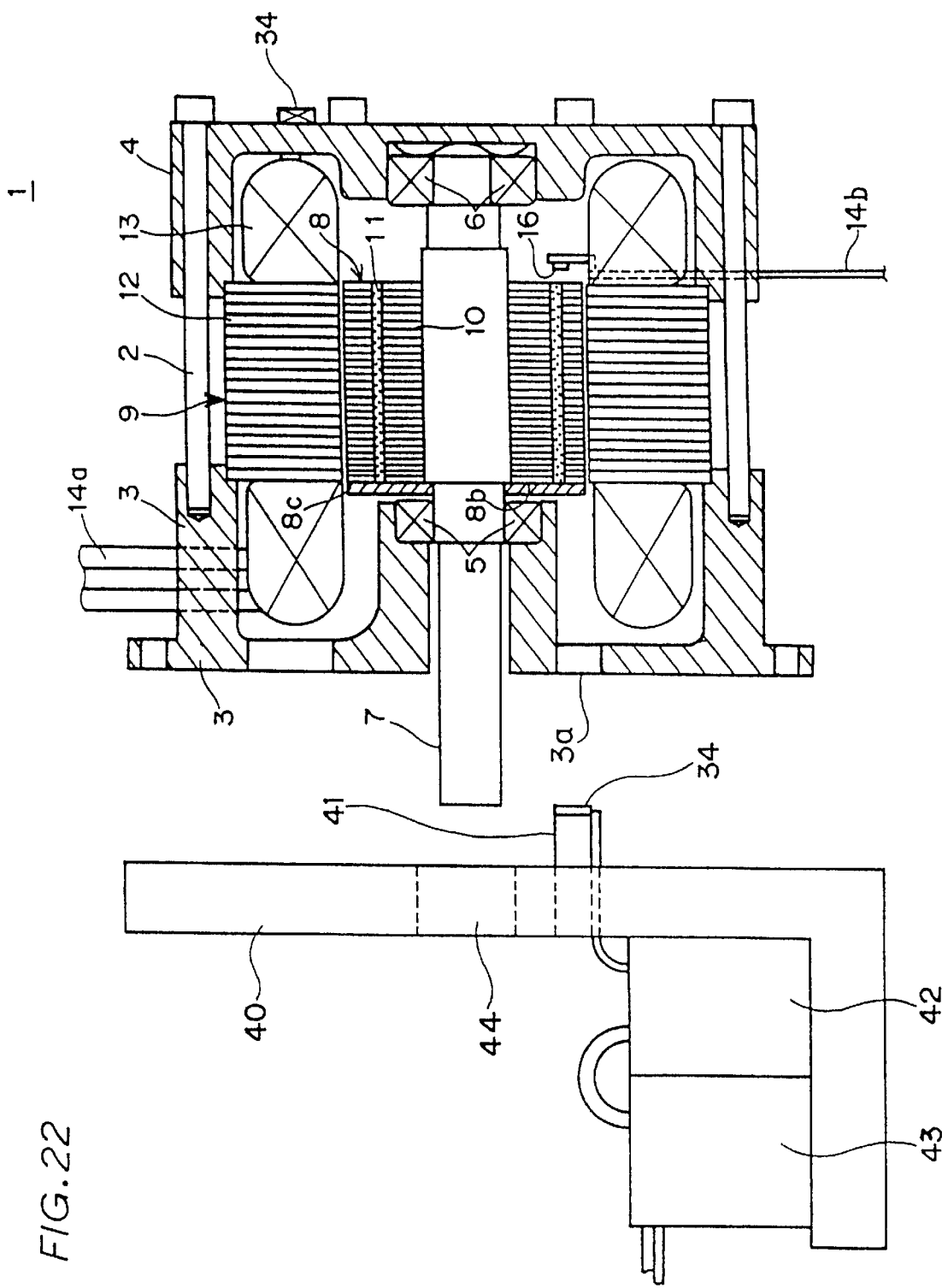
[FIG. 22] A sectional view showing a brushless motor and a fixing member for fixing it.

And, FIG. 22 shows another embodiment which effectively uses the aforementioned leaked magnetic flux to use as the power supply for controlling the external actuator. In this case, a part 41, which protrudes toward the housing member 3 of the brushless motor 1, is disposed on a mounting plate 40 to which the brushless motor 1 is fixed, the above generating coil 34 is attached to the leading end of the part 41, and a lead 14 from the generating coil 34 is connected to a control circuit 42 and a battery 43. On the other hand, a hole 3a is formed in the housing member 3 to align with the generating coil 34, and the part 41 is passed through the hole 3a to set the generating coil 34 close to the rotor end face 8*b*. In FIG. 22, reference numeral 44 indicates a hole through which the rotatable shaft 7 is passed. The generating coil 34 which is, for example, a sheet coil may be disposed outside of the housing member 4 opposite from the housing member 3 which is in contact with the mounting plate 40. Thus, the generating coil 34 can be disposed on an appropriate plate inside or outside of the motor to use the obtained power for the magnetic sensors and as a driving power for the outside of the motor. These embodiments using the leaked magnetic flux from the rotor to generate a back electromotive force can be also used when the rotor is rotating by inertia.

Figure 23:
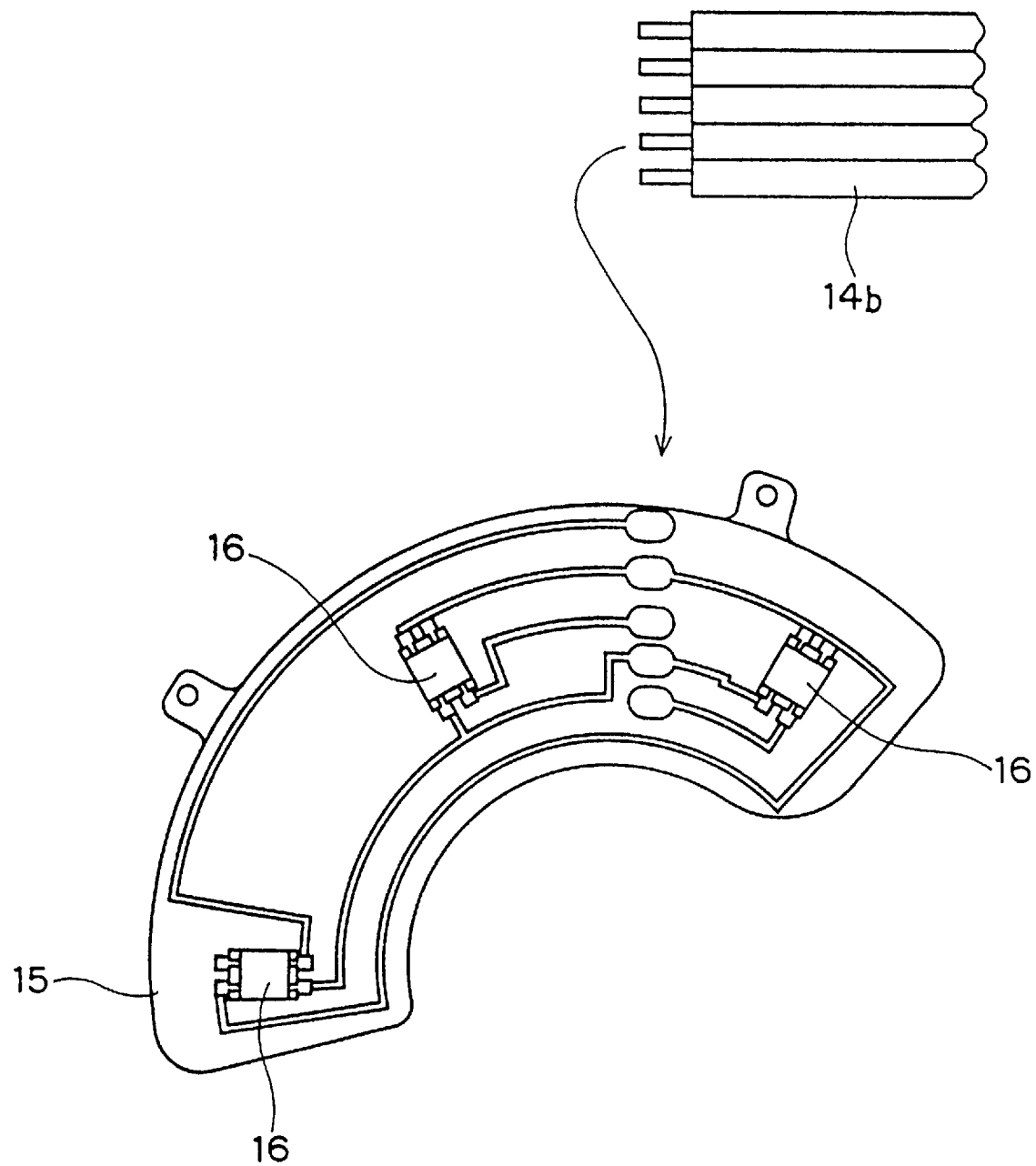
[FIG. 23] A view showing a magnetic sensor board.
Figure 24:
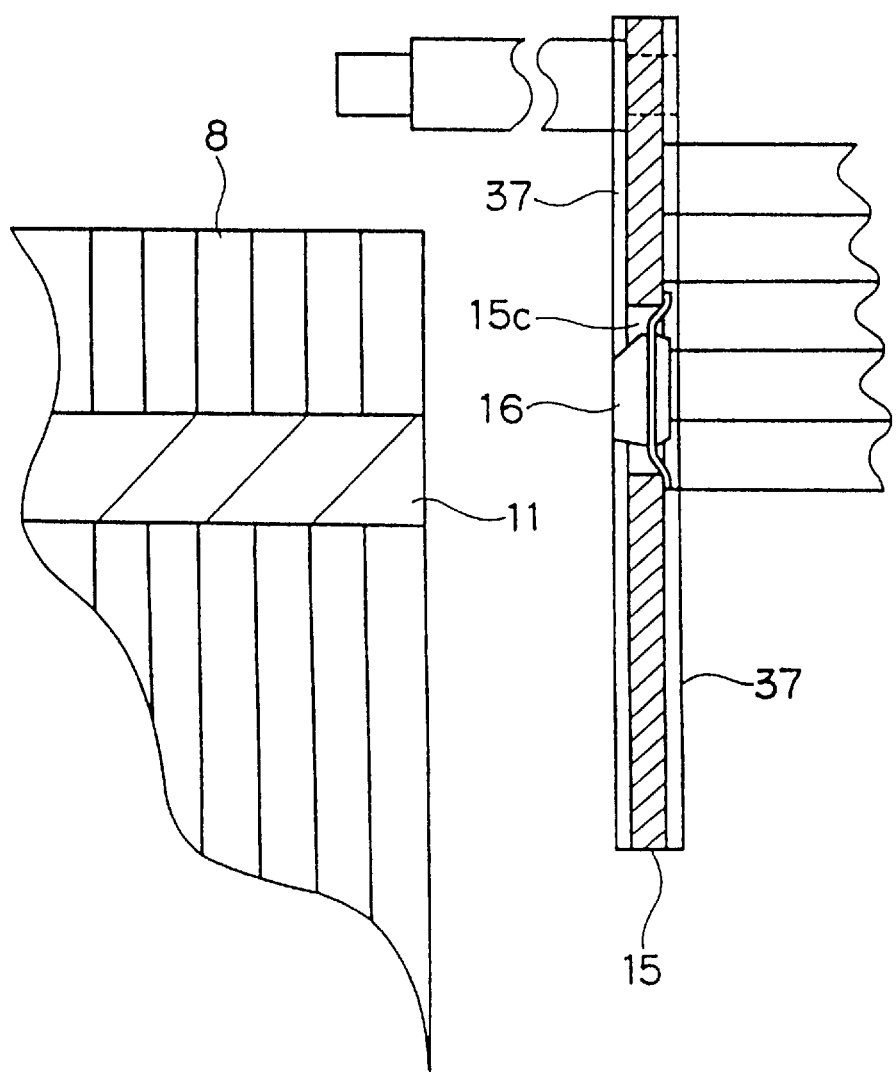
[FIG. 24] A sectional view of a magnetic sensor board.

FIG. 23 and FIG. 24 are views showing another embodiment of the magnetic sensor board. Hollow portions 15*c* are formed in the magnetic sensor board 15, the magnetic sensors 16 are fitted in the hollow portions 15*c*, and the front and back faces of the magnetic sensor board 15 are molded with a nonconductive resin 37 which contains a material having good heat conductivity, such as alumina material. In this structure, since the hollow portions 15*c* are formed in the magnetic sensor board 15, positioning of the magnetic sensors 16 can be made easily, and molding with the radiating resin 37 allows satisfactory radiation of the magnetic sensors. Conventionally, the magnetic sensors were mounted on the magnetic sensor board, which therefore had an uneven surface because of the magnetic sensors, making it difficult to mold with a resin. But, in this embodiment, since the hollow portions 15*c* are formed and the magnetic sensors 16 are fitted therein, a positioning effect is provided and the board has a flat surface, making it easy to mold with a resin. Besides, a radiating effect can be obtained by molding with the resin as described above.

Figure 25:
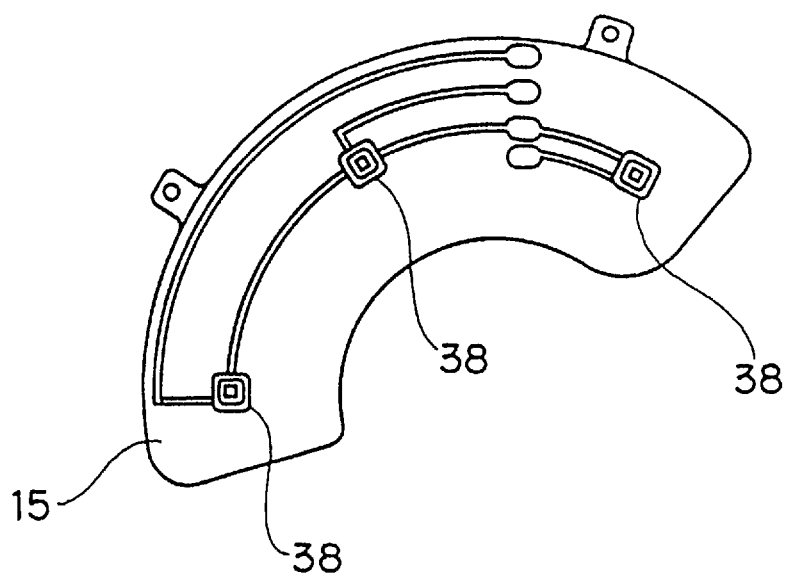
[FIG. 25] A view showing a magnetic sensor board using a sheet coil.
Figure 26:
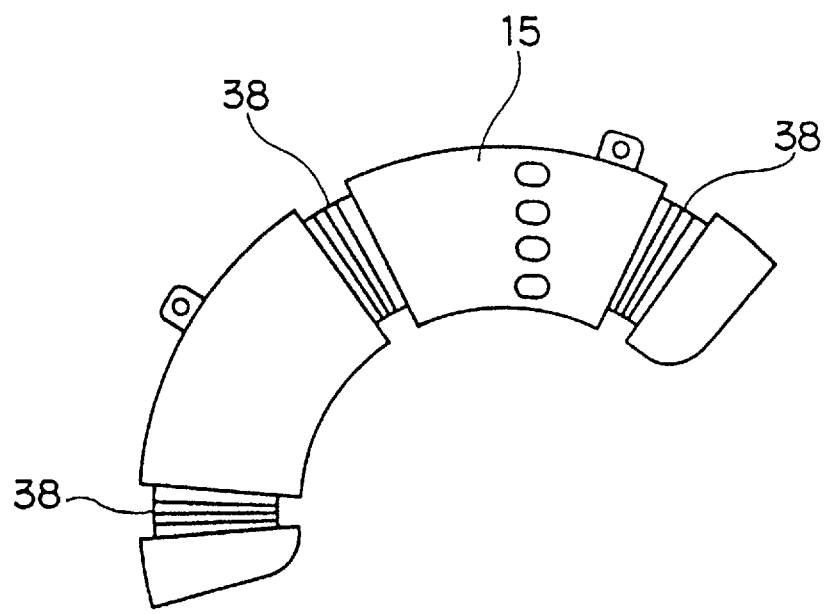
[FIG. 26] A view showing a magnetic sensor board having toroidal windings applied.

FIG. 25 and FIG. 26 show that coils 38 are used as the magnetic sensors. FIG. 25 shows sheet coils, and FIG. 26 shows coils having toroidal windings applied. In these cases, a back electromotive force is generated when the leaked magnetic flux from the rotor crosses the coils 38 and used as a position detecting signal.

Figure 27:
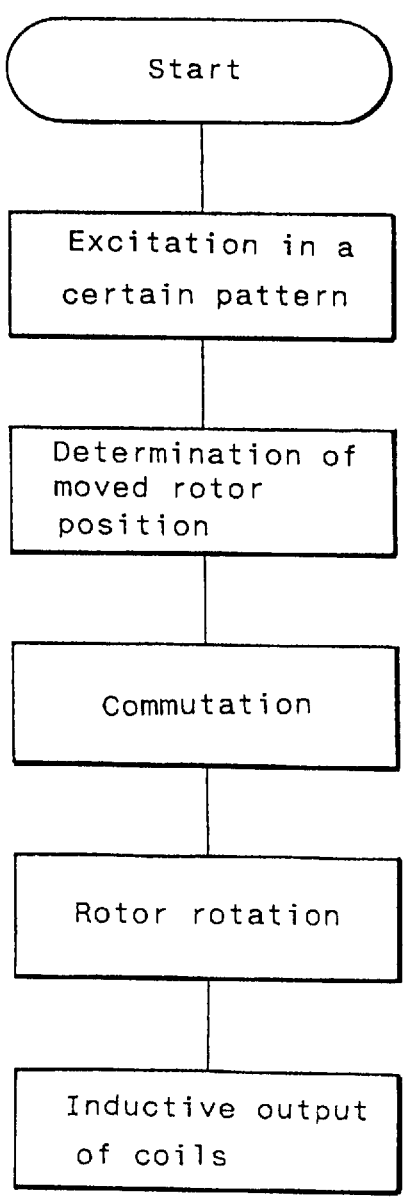
[FIG. 27] A flowchart showing the control of a motor rotation.

As described above, when the back electromotive force is used to detect a position, the position cannot be detected at the time of starting when the rotor remains stationary because the back electromotive force is not generated yet. Therefore, the control shown in FIG. 27 is conducted. Specifically, in the flowchart of FIG. 27, first, excitation is made with a current of a limited value of a current limiter by a drive signal having a certain pattern for a prescribed time. Thus, the rotor moves to a position corresponding to the exciting pattern and its position is determined. Then, when a commutation signal is given under a state that a current is passed to switch an output pattern, the motor is rotated to generate the back electromotive force, and the position is detected by the coils. When such coils are used, the magnetic sensors such as a Hall element and a Hall IC are not needed, and these coils can be produced inexpensively because a copper wire is used. And, they have advantages that a small number of terminals is used as compared with conventional magnetic sensors, they are heat resistant, and a tolerance is not strict in their production.

Figure 28:
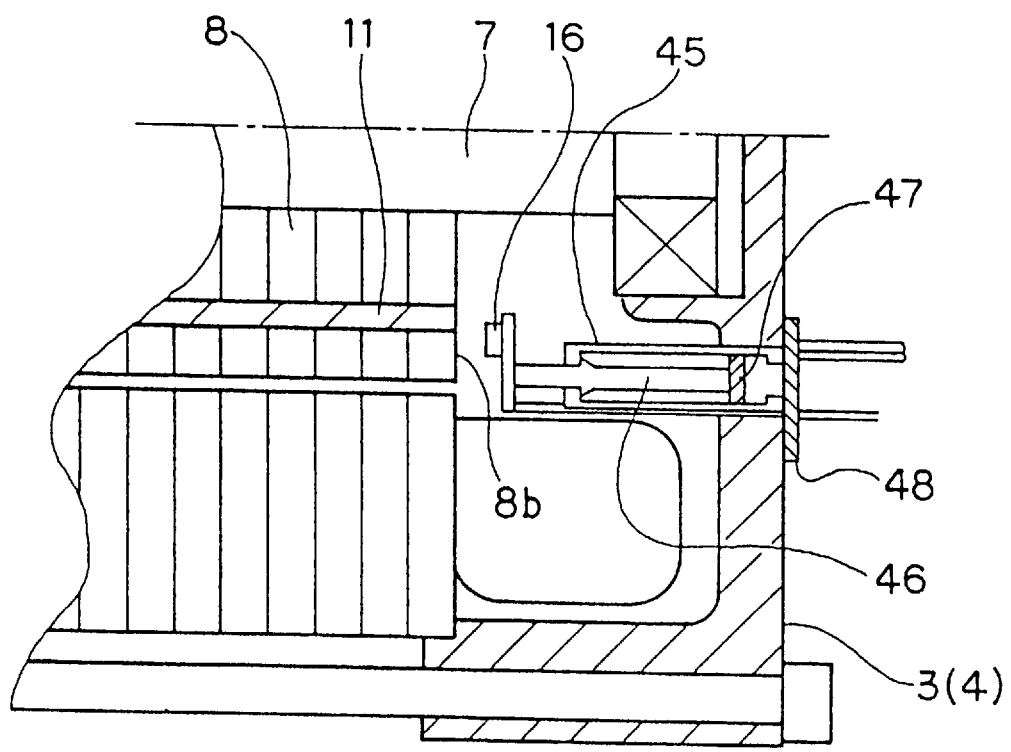
[FIG. 28] A view partly showing a magnetic sensor and a rotor.
Figure 29:
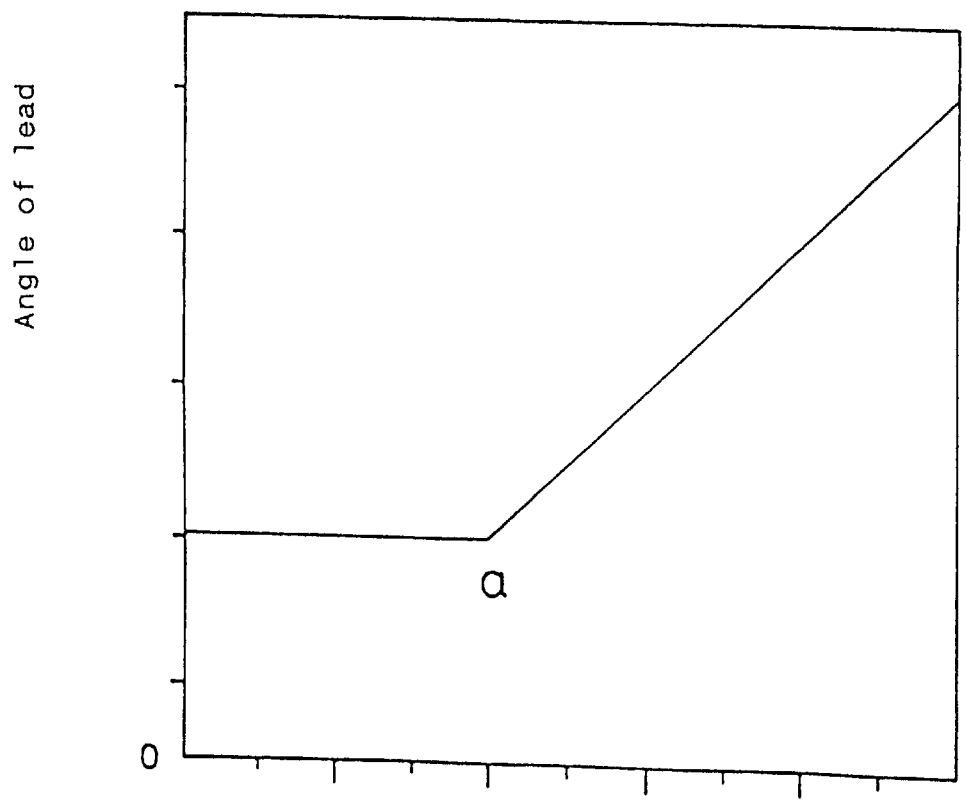
[FIG. 29] A graph showing the relation between an angle of lead and a distance between a magnetic sensor 16 and a rotor end face 8b.
Figure 30:
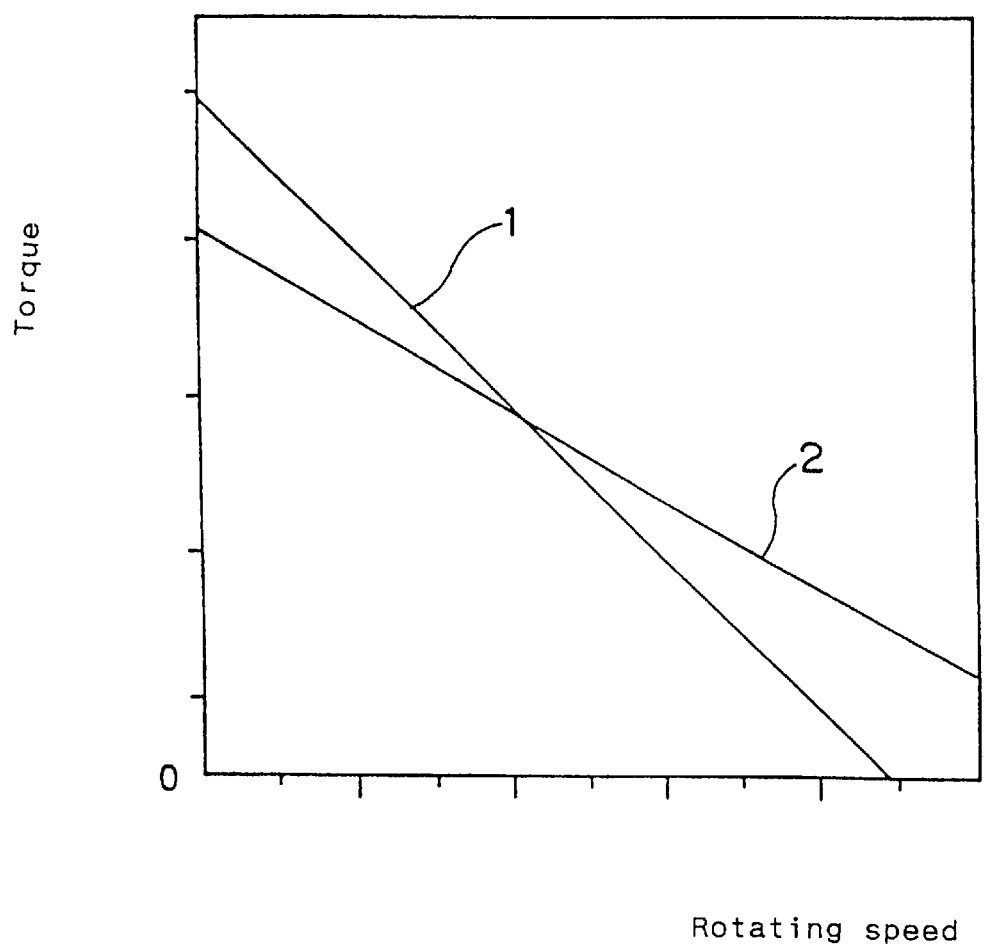
[FIG. 30] A graph showing the relation between a positional change of a magnetic sensor and a rotation speed and torque.

FIG. 28 shows that the magnetic sensor 16 is movably disposed with respect to the rotor end face 8*b*. Specifically, a cylindrical body 45 is disposed at an appropriate place within the housing members 3, 4, a nonmagnetic working rod 46 is movably disposed axially in the cylindrical body 45, the magnetic sensor 16 is fixed to the working rod 46 on its rotor side, and a magnet 47 is fixed to the other end of the working rod 46. Opposing to the magnet 47, a film coil 48 is disposed outside of the housing member to electrically conduct it. Therefore, the film coil 48 is excited by passing a current, the magnetism of the film coil 48 is changed by a controller not shown to attract or repulse the magnet 47, the magnetic sensor 16 is axially moved by the working rod 46 to adjust a distance from the rotor end face 8*b*, and a rotation area of the motor is changed accordingly. FIG. 29 is a graph showing the relation between an angle of lead and a distance between the magnetic sensor 16 and the rotor end face 8*b* when the magnetic sensor 16 is moved as described above. It is seen that when the magnetic sensor 16 moves away from the rotor end face 8*b*, the angle of lead advances proportionally from point a in the drawing. This point a was experimentally obtained to be a value of 1.5 times of the thickness of the field permanent magnet 11. And, in FIG. 30, the line indicated by the lead line 1 shows that the magnet 47 and the film coil 48 are repulsed to each other, or the magnet 47 is close to the rotor end face 8*b*, and the line indicated by the lead line 2 shows that the magnet 47 and the film coil 48 are attracted to each other, or the magnet 47 is away from the rotor end face 8*b* than when indicated by the lead line 1. Thus, when the position of the magnet 47 is movable against the rotor end face 8*b*, net properties can be changed. In the invention of the first group, when the magnetic sensor 16 is movably disposed with respect to the rotor end face 8*b*, in addition to the aforementioned effects, positioning of the setting position of the magnetic sensor can be facilitated in a range of a distance or below that the leaked magnetic flux outside the rotor end face can be directly detected and a distance or more that a noise is generated in the detected signal due to an irregular magnetic flux near the rotor end face.

The above embodiments have been described assuming that a temperature is almost constant. If the temperature condition is extremely variable when the motor is rotating, it is expected to use a temperature compensation means. And, to compensate for a temperature change, a temperature sensor is generally an essential component. Therefore, the inventors propose a technical means to detect the motor temperature without using a temperature sensor.

Figure 31:
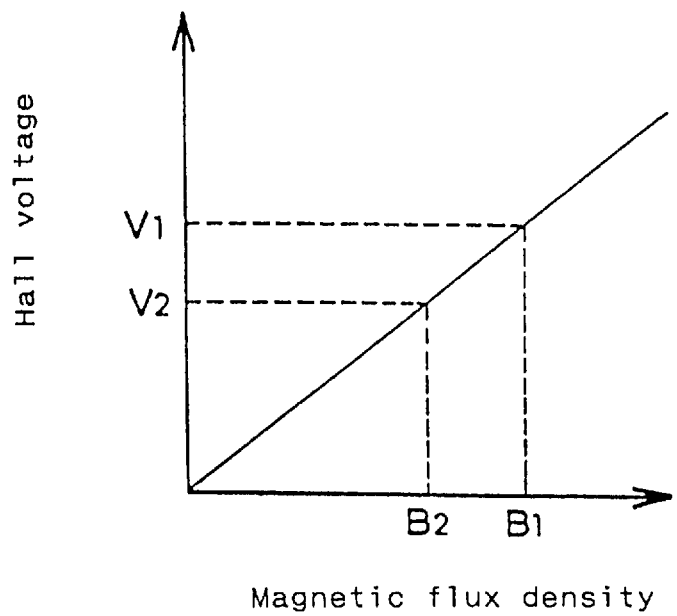
[FIG. 31] A graph showing the relation between a Hall voltage and a magnetic flux density.
Figure 32:
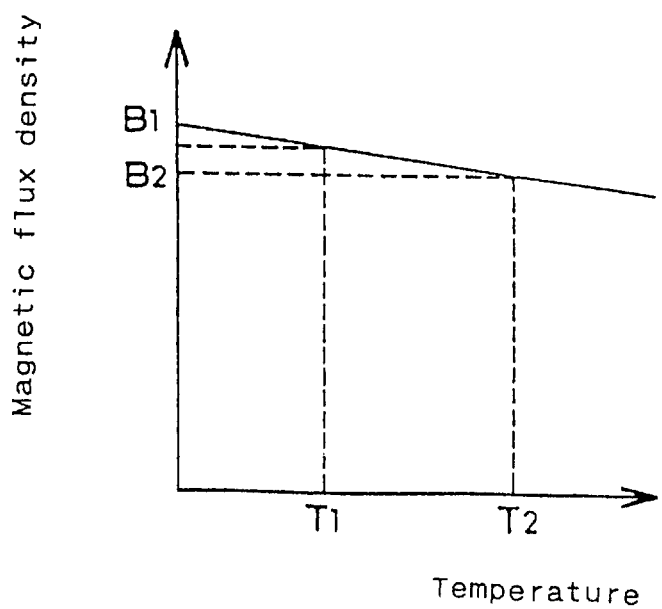
[FIG. 32] A graph showing the relation between a magnetic flux density and a temperature.
Figure 33:
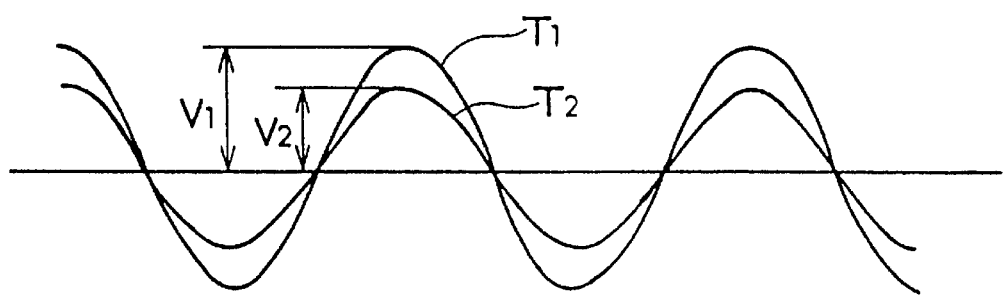
[FIG. 33] A view showing an output voltage waveform of a magnetic sensor with a rotor rotated.

Specifically, as shown in FIG. 31, a Hall voltage and a magnetic flux density have a prescribed proportional relation and, as shown in FIG. 32, a magnetic flux density and a temperature also have a prescribed relation. FIG. 33 shows output voltage waveforms of the magnetic sensor when the rotor is rotating. It is seen that the magnetic flux density decreases as the magnet temperature rises, and the output voltage of the magnetic sensor lowers as the magnetic flux density decreases. Using these relations, or determining these relations in advance, a magnetic flux density and temperature table is incorporated in the form of, for example, a ROM in the control circuit, so that the motor temperature can be monitored according to the output voltage of the magnetic sensor. Furthermore, a quantity of demagnetization of the rotor magnet can be also detected according to the output voltage of the magnetic sensor. In the above structure, since the monitored temperature can be detected according to a change in analogue output value of the magnetic sensor, a dedicated temperature sensor is not required, enabling to reduce the cost. And, the demagnetization of the rotor magnet due to a temperature increase or unexpected phenomena can be detected according to a change in analogue output value of the magnetic sensor, so that degradation of the magnet performance can be seen. Besides, a temperature of the magnet being rotated can be directly detected without using a temperature sensor.

Figure 34:
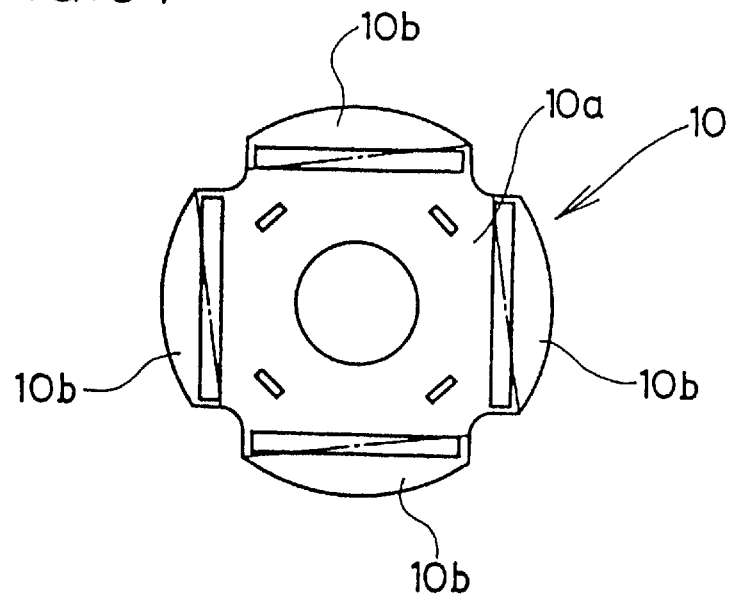
[FIG. 34] A view showing a rotor end face.
Figure 35:
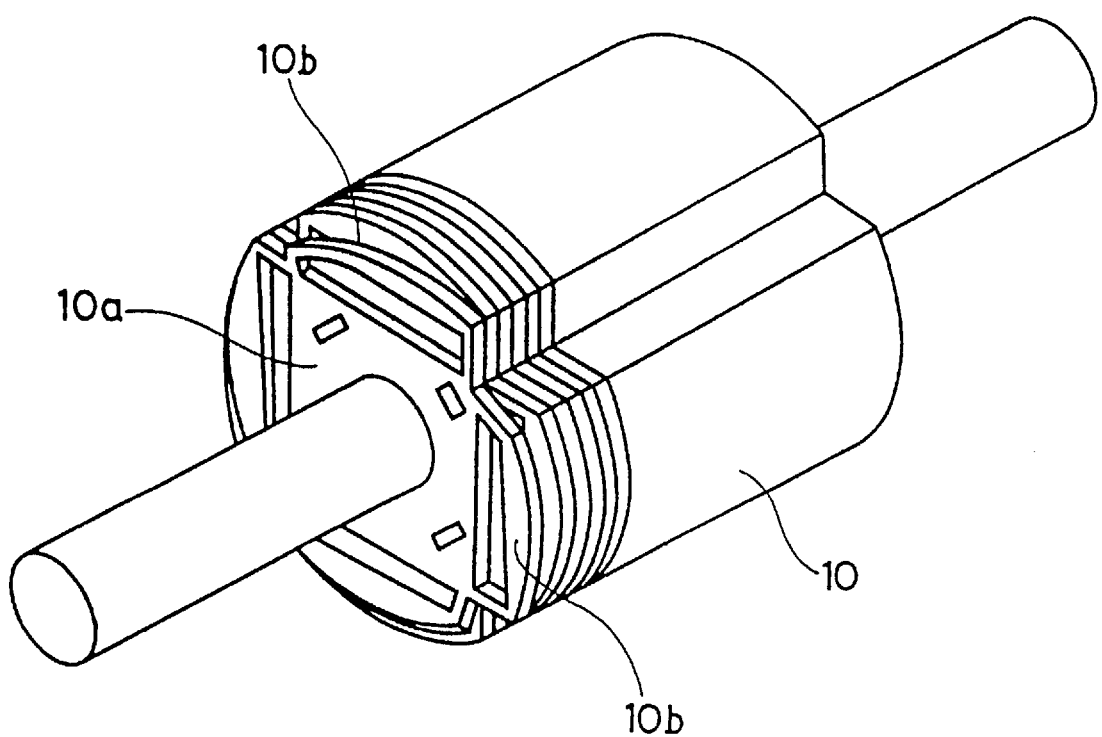
[FIG. 35] A perspective view showing a rotor.
Figure 36:
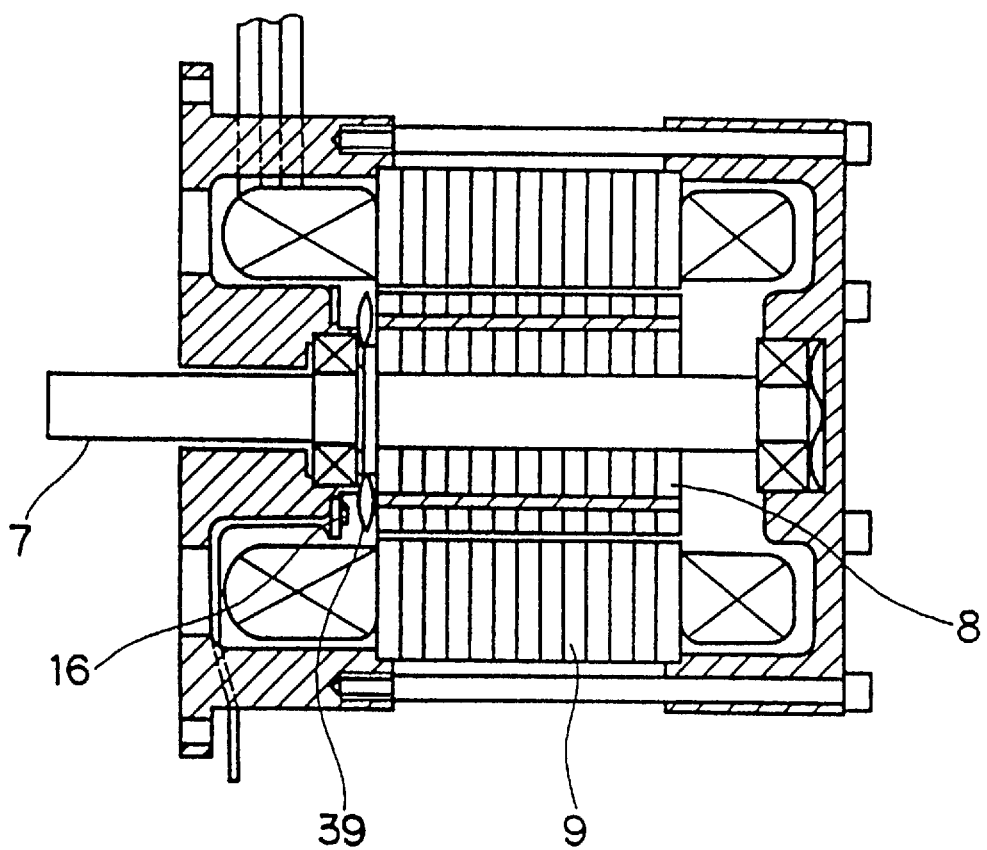
[FIG. 36] A vertical sectional view showing a brushless motor with a built-in fan.
Figure 37:
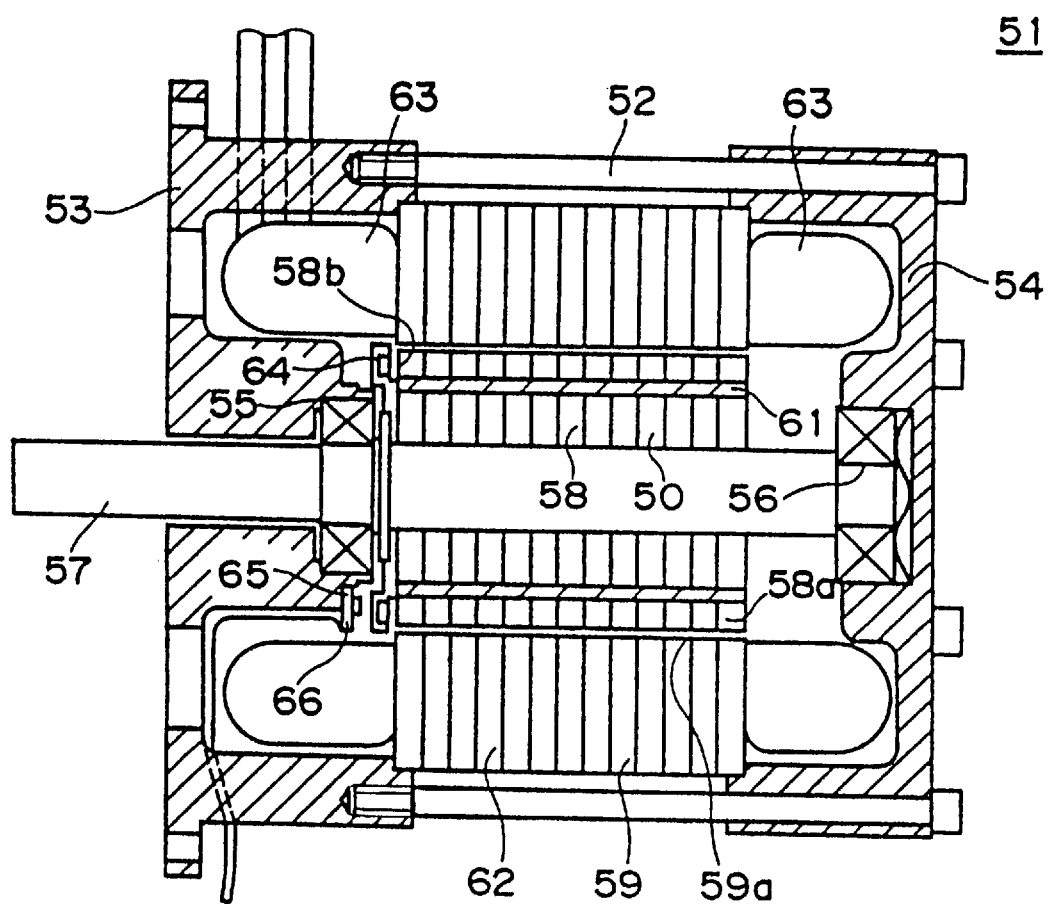
[FIG. 37] A vertical sectional view showing a conventional brushless motor.

In view of the fact that the magnetic sensor and the magnetic flux density are influenced by a temperature as described above, the following embodiment proposes a structure that the motor interior can be cooled. Specifically, as shown in FIG. 34 to FIG. 36, a fan is formed. FIG. 34 and FIG. 35 show that leading ends 10b of magnetic pole portions of a steel plate 10a of the rotor yoke 10 are bent slantingly in the form of a fan. Therefore, ventilation is made by the leading ends 10b of the magnetic pole portions of the steel plate 10a when the rotor is rotated, to cool the magnetic sensor. Thus, an effect by an ambient temperature change is reduced, and a stable output voltage is attained. FIG. 36 shows that a fan 39 fixed to the rotational shaft 7 is disposed between the rotor end face 8b and the magnetic sensor 16. In the same way as above, the magnetic sensor and the motor are cooled, and a stable output voltage can be obtained. This fan 39 is made of a nonmagnetic material so as not to effect on the leaked magnetic flux from the rotor end face. Therefore, the fan 39 does not cause a detection failure.

INDUSTRIAL APPLICABILITY

This invention can detect a peak point of the magnetic flux density around a rotor in a brushless motor which detects a rotational position of the rotor using a magnetic sensor, and is optimum for a brushless motor which is required to have a high motor efficiency.

We claim:

1. A brushless motor comprising:

a housing;

a rotatable shaft supported by said housing for rotation;

a rotor yoke secured to said rotatable shaft for rotation within said housing and having a plurality of laminated steel plates with an even number of magnetic poles forming an even number of grooves between said magnetic poles;

at least one or two field permanent magnets inserted in every other or each of said magnetic poles to produce magnetic fluxes and provide at least one or two pairs of bridge portions between said grooves and said field permanent magnets;

said bridge portions being made so thin that said bridge portions are saturated with said magnetic fluxes;

at least one magnetic sensor provided on said housing so as to face an end face of said rotor yoke to detect a magnetic flux leaked into an outside of said end face of said rotor yoke between adjacent magnetic poles; and said magnetic sensor being provided in an annular area between a first circle having a first radius equal to a first distance between a center of said rotatable shaft and an outer surface of said field permanent magnet and a second circle having a second radius equal to a second distance between said center of said rotatable shaft and an outer end of said rotor yoke so as to detect stable magnetic flux and thus provide a stable motor rotation.

2. A brushless motor according to claim 1, wherein said grooves have a bottom portion substantially aligned with a trajectory of rotation of said magnetic sensor.

3. A brushless motor according to claim 1, which further comprises a nonmagnetic plate provided between said magnetic sensor and said end face of said rotor yoke to reduce said noise.

4. A brushless motor according to claim 1, wherein said field permanent magnets have an end face positioned inside of said end face of said rotor yoke.

5. A brushless motor according to claim 1, wherein said magnetic sensor is axially movable.

6. A brushless motor according to claim 1, which further comprises a plurality of caulking sections provided in said laminated steel plates at positions between said rotatable shaft and said field magnets.

7. A brushless motor according to claim 1, wherein said magnetic sensor is set to scan a range from said first circle to a third circle having a third radius equal to a third distance between said center of said rotatable shaft and a middle point between said outside of said field magnets and said outer end of said rotor yoke.

8. A brushless motor, comprising:

a housing;

a rotor yoke having a plurality of laminated steel plates with an even number of magnetic poles and rotatably supported by said housing;

at least one or two field permanent magnets provided in every other or each of said magnetic poles;

a magnetic piece provided on an end face of said rotor yoke for use in detecting a rotational position of said rotor yoke;

clockwise and counterclockwise magnetic sensors provided in vicinity of a trajectory of rotation of said magnetic piece for directly detecting rotational positions of said rotor in clockwise and counterclockwise directions, respectively; and said clockwise and counterclockwise magnetic sensors being displaced in counterclockwise and clockwise directions, respectively, from the center of said magnetic poles by an angle substantially equal to a lead angle of a magnetic flux, wherein said lead angle is a difference in electrical angle between a first peak point of a flux density in an outside space of said rotor yoke end face where there is magnetic interaction with said stator and a second peak point of said flux density where there is no magnetic interaction with said stator.

9. A brushless motor according to claims 1 or 8, wherein a Hall IC is used for the magnetic sensor, and a distance between the Hall IC and the rotor yoke end face is at least larger than a thickness of the field magnet.

10. A brushless motor according to claims 1 or 8, wherein a Hall element is used for the magnetic sensor, and a decrease in magnetism of the rotor magnet is detected according to a relation among a Hall voltage, a magnetic flux density and a temperature.

11. A brushless motor according to claim 10, which further comprising a plurality of magnetic sensors for detecting a magnetic flux leaked outside from an end face of the rotor, provided on a plurality of concentric circles having different diameters according to different angles of lead of said flux density in the outside space of said rotor yoke end face, wherein said angle of lead is a difference in electrical angle between a first peak point of said outside magnetic flux density where there is magnetic interaction with said stator and a second peak point of said outside magnetic flux density where there is no magnetic interaction with said stator.

12. A brushless motor according to claims 1 or 8, wherein leading ends of magnetic pole portions of a steel plate of the rotor yoke are bent slantingly in the form of a fan, and ventilation is made by the leading ends of the magnetic pole portions by rotation yoke of the rotor to cool the magnetic sensor.

13. A brushless motor according to claims 1 or 8, wherein a generating coil is disposed on a magnetic sensor board to obtain a back electromotive force by said coil with the leaked magnetic flux from the rotor and the back electromotive force is stored in a rechargeable power supply via an electronic circuit.

14. A brushless motor according to claim 1 or 8, wherein a generating coil is disposed on a tooth portion of the stator to obtain a back electromotive force by said coil with the leaked magnetic flux from the rotor and the back electromotive force is stored in a rechargeable power supply via an electronic circuit.

15. A brushless motor according to claims 1 or 8, wherein a part, which protrudes toward housing of the brushless motor, is disposed on a mounting plate to which the brushless motor is fixed, a generating coil is attached to said part, said housing member has a hole formed to align with said generating coil, and said part is passed through the hole to set said generating coil close to the rotor end face.

16. A brushless motor according to claims 1 or 8, wherein a generating coil is disposed outside said housing to obtain a back electromotive force by said coil with the leaked magnetic flux from the rotor.

* * * * *